United States Patent
McTeer

[15] 3,700,722
[45] Oct. 24, 1972

[54] DI(1-ACYLOXY-ALIPHATIC) ETHERS AND DERIVATIVES THEREOF

[72] Inventor: Lucian W. McTeer, South Charleston, W. Va.

[73] Assignee: Union Carbide Corporation, New York, N.Y.

[22] Filed: Dec. 27, 1968

[21] Appl. No.: 787,543

Related U.S. Application Data

[60] Division of Ser. No. 569,017, Aug. 1, 1966, Pat. No. 3,499,028, which is a division of Ser. No. 458,757, May 25, 1965, Pat. No. 3,326,969, which is a continuation-in-part of Ser. No. 65,943, Oct. 31, 1960, abandoned, which is a continuation-in-part of Ser. No. 839,057, Sept. 10, 1959, abandoned.

[52] U.S. Cl. ............................................. 260/486 R
[51] Int. Cl. ....C07c 69/52, C07c 69/54, C07c 69/56
[58] Field of Search ................ 260/486 R, 486, 497 R

[56] References Cited

UNITED STATES PATENTS 2,638,479   5/1953   Ballard.................... 260/497 R
2,759,953   8/1956   Knight et al............. 260/497 R

OTHER PUBLICATIONS

Journal of the American Chemical Society Vol. 60, 1938 P. 358, 359.

*Primary Examiner*—Lorraine A. Weinberger
*Assistant Examiner*—John F. Terapane
*Attorney*—Paul A. Rose, Louis C. Smith, Francis M. Fazio and John S. Piscitello

[57] ABSTRACT

Asymmetrical di(1-acyloxyaliphatic) ethers produced by reacting a symmetrical di(1-acyloxyaliphatic) ether or a 1,2-ethylenically unsaturated aliphatic 1-acyloxyaliphatic ether with a monocarboxylic acid.

5 Claims, No Drawings

DI(1-ACYLOXY-ALIPHATIC) ETHERS AND DERIVATIVES THEREOF

This application is a divisional application of application Ser. No. 569,017, entitled "Di(1-Acyloxyaliphatic) Ethers And Derivatives Thereof", filed Aug. 1, 1966 now U.S. Pat. No. 3,499,028, which is a division of application Ser. No. 458,757, filed May 25, 1965 now U.S. Pat. No. 3,326,969, which is a continuation-in-part of application Ser. No. 65,943, filed Oct. 31, 1960 now abandoned, which is a continuation-in-part-in-part of application Ser. No. 839,057, filed Sept. 10, 1959 now abandoned.

The present invention relates to improved processes for the production of di(1-acyloxyaliphatic) ethers, certain of which ethers constitute novel compositions of matter, and to the production of novel derivatives thereof. More particularly, the invention relates to the production of di(1-acyloxyaliphatic) ethers by the reaction of aliphatic aldehydes with aliphatic and monocyclic aromatic monocarboxylic acid anhydrides, such processes being carried out within the limited operating conditions hereinbelow described. The invention is also concerned with the production of asymmetrical di(1-acyloxyaliphatic) ethers by the reaction of symmetrical di(1-acyloxyaliphatic) ethers with monocarboxylic acids. The invention is further concerned with the conversion of the di(1-acyloxyaliphatic) ether products to a novel class of monoester aliphatic ether compounds, namely 1,2-ethylenically unsaturated aliphatic 1-acyloxyaliphatic ethers, and halogenated derivatives thereof. In addition, the invention is concerned with the production of asymmetrical di(1-acyloxyaliphatic) ethers by the reaction of the above-mentioned monoester aliphatic ethers with a monocarboxylic acid. Finally, the invention is concerned with the polymerization of di(1-acyloxyaliphatic) ethers in which either or both of the acyloxy radicals are ethylenically unsaturated in the 2,3-, i.e. alpha, beta-position, and also, with the polymerization of the 1,2-ethylenically unsaturated aliphatic 1-acyloxyaliphatic ethers, to provide novel and useful polymeric products.

As is well known to the art, aliphatic aldehydes have heretofore been reacted with aliphatic monocarboxylic acid anhydrides so as to obtain as products a wide variety of aldehyde 1,1-diacylates, including both 1,1-diacyloxyalkanes and 1,1-diacyloxyalkenes. Processes of this nature are described, for instance, in U.S. Pat. No. 2,866,813 and in Jour. Am. Chem. Soc. 72, 847 (1950), and are conventionally carried out by the introduction of the aldehyde to the anhydride, or by the simultaneous addition of the reactants to a reaction vessel, in each instance generally utilizing an amount of anhydride substantially in excess of an equimolar proportion with respect to the amount of aldehyde undergoing reaction. Moreover, performed as hereinabove described, there prior art processes have found predominant application in the production of 1,1-diacyloxy-2-alkenes, wherein an alpha,beta-unsaturated aliphatic aldehyde is employed as a reactant.

In contrast with the aforementioned processes, it has now been found that di(1-acyloxyaliphatic) ethers can be obtained as a product in major quantities, accompanied by formation of aldehyde 1,1-diacylates as a by-product in at most only minor amounts, by the predominantly liquid phase reaction of an aliphatic aldehyde containing at least two carbon atoms, the alpha carbon atom of which is necessarily a saturated carbon atom, with an aliphatic or monocyclic aromatic monocarboxylic acid anhydride. The reaction is ordinarily carried out in the presence of a catalytic amount of an acidic catalyst and at a temperature of up to about 150° C. In addition, the reaction must be performed in a manner assuring the absence of a molar excess of the anhydride during the course of the reaction. That is to say, the presence of at least one mole, and preferably more than one mole in the aldehyde per mole of the anhydride is required at all times in the reaction mixture if a substantial quantity of a di-(1-acyloxyaliphatic) ether is to be obtained as a product.

The production of di(1-acyloxyaliphatic) ethers by the reaction of an aliphatic aldehyde with a monocarboxylic acid anhydride in accordance with this invention can be defined more clearly by representation in connection with the following general equation:

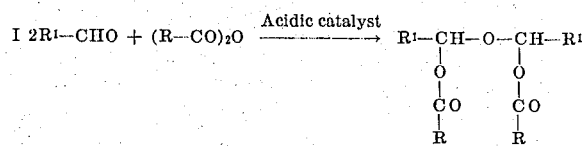

In the above equation: R designates a monovalent radical selected from the group consisting of the aliphatic hydrocarbon radicals, which preferably contain from one to about 11 carbon atoms, and the monocyclic hydrocarbon aryl and aralkyl radicals, which preferably contain from six to 11 carbon atoms; $R^1$ designated a monovalent aliphatic hydrocarbon radical which is connected to the adjacent carbon atom by a saturated carbon atom, and which preferably contains from one to about 11 carbon atoms. As typical of the aliphatic radicals designated by R and $R^1$ there can be mentioned the alkyl radicals such as methyl, ethyl, propyl, butyl, isobutyl, pentyl, hexyl, octyl, ethylhexyl, decyl, undecyl, dodecyl radicals, etc.; the alkenyl and alkadienyl radicals such as propenyl, butenyl, isobutenyl, pentenyl, hexenyl, octenyl, pentadienyl radicals, etc., and the like. In addition, $R^1$ can designate a monovalent monocyclic hydrocarbon aryl or aralkyl radical such as a phenyl, methylphenyl, ethylphenyl, propylphenyl, phenylmethyl, phenylethyl, phenylbutyl radical, etc., and the like.

It is to be noted in this connection that the use of formaldehyde or an alpha, beta-unsaturated aldehyde as a reactant is specifically excluded from the scope of this invention, the use of such aldehydes having been found unsuited to the production of di(1-acyloxyaliphatic) ethers as herein described. It is to be noted further that the aliphatic hydrocarbon and aromatic hydrocarbon radicals designated by R and the aliphatic hydrocarbon radicals designated by $R^1$ can also be substituted by groups such as alkoxy radicals, and preferably lower alkoxy radicals containing from one to about four carbon atoms, such as methoxy, ethoxy, butoxy radicals etc., halogen atoms and the like.

As illustrative of the di(1-acyloxyaliphatic) ethers produced in accordance with this invention there can be mentioned the following:

di(1-acetoxyethyl) ether di(1-propionoxyethyl) ether
di[1-(3-ethoxypropionoxy)ethyl] ether
di(1-butyroxyethyl) ether
di[1-(3-methoxybutyroxy)ethyl] ether
di[1-(2-ethylbutyroxy)ethyl] ether
di[1-(2-methylpentanoxy)ethyl] ether
di[1-(2-ethylhexoxy)ethyl] ether
di(1-dodecanoxyethyl) ether
di(1-acryloxyethyl) ether
di(1-methacryloxyethyl) ether
di(1-crotonoxyethyl) ether
di[1-(2-methylcrotonoxy)ethyl] ether
di[1-(2,4-hexadienoxy)ethyl] ether
di(1-benzoxyethyl) ether
di(1-ortho-toluyloxyethyl) ether
di(1-phenylacetoxyethyl) ether
di(1-phenylbutyroxyethyl) ether
di(1-para-methoxybenzoxyethyl) ether
di(1-para-vinylbenzoxyethyl) ether
di(1-acetoxypropyl) ether
di(1-acetoxy-3-ethoxyropyl) ether
di[1-(2-methylpentanoxy)propyl] ether
di[1-(2-ethylhexoxy)propyl] ether
di(1-propionoxy-n-butyl) ether
di(1-acetoxyisobutyl) ether
di(1-acetoxy-3-methoxy-n-butyl)ether
di(1-butyroxy-n-butyl) ether
di(1-acetoxy-2-methylpentyl) ether
di(1-acetoxy-2-ethylhexyl) ether
di(1-acetoxydodecyl ether
di(1-acetoxy-4-pentenyl) ether
di(1-crotonoxy-4-pentenyl) ether, and the like.

In particular, it is the di(1-acyloxyaliphatic) ethers represented above in connection with equation I wherein R and/or $R^1$ designates either an unsaturated aliphatic hydrocarbon radical or an alkoxy-substituted aliphatic hydrocarbon radical, or wherein R designates an aromatic radical, that constitute novel compositions of matter. Thus, the novel compositions of matter contemplated in this respect are such that when $R^1$ designates a saturated unsubstituted aliphatic radical, i.e., a saturated aliphatic hydrocarbon radical, R designated a member selected from the group consisting of the monovalent unsaturated aliphatic hydrocarbon and lower alkoxy-substituted aliphatic hydrocarbon radicals and the monovalent monocyclic hydrocarbon aryl, aralkyl and lower alkoxy-substituted hydrocarbon aryl and aralkyl radicals.

The aliphatic aldehydes suitable for use as a reactant in accordance with this invention include, for example, ethanal, propanal, 3-ethoxypropanal, n-butanal, isobutanal, 3-methoxy-n-butanal, 3-ethoxy-n-butanal, 2-methylpentanal, 2-ethylhexanal, dodecanal, 4-pentenal, etc. and the like. Of these reactants, the use of the saturated aliphatic aldehydes is preferred. Moreover, in addition to these monomeric aldehydes, the cyclic polymers of the lower molecular weight aldehydes, such as para-acetaldehyde, can also be utilized as the aldehyde reactant. In like illustrative manner, the monocarboxylic acid anhydrides suitable for use as a reactant in accordance with the invention include the anhydrides of acetic acid, propionic acid, 3-ethoxypropionic acid, butyric acid, 3-methoxybutyric acid, 2-ethylbutyric acid, 2-methyl-pentanoic acid, 2-ethylhexanoic acid, dodecanoic acid, acrylic acid, methacrylic acid, crotonic acid, 2-methylcrotonic acid, 2,4-hexadienoic acid, benzoic acid, ortho-toluic acid, para-methoxy benzoic acid, para-vinylbenzoic acid, phenylacetic acid, phenylbutyric acid and the like. Of these reactants, the use of the aliphatic monocarboxylic acid anhydrides, and especially the saturated aliphatic monocarboxylic acid anhydrides, is preferred. In this connection, it is to be noted that, while mixtures of aliphatic aldehydes and/or the anhydrides of mixed monocarboxylic acids can also be employed as reactants in accordance with this invention, whereby asymmetrical di(1-acyloxyaliphatic) ethers wherein R and/or $R^1$ represent more than one type of radical within the meanings hereinabove described are obtained, the use of such mixtures as reactants is preferably avoided since the multiplicity of products thus formed are often separated only with difficulty. This has been found to be true especially when an anhydride of mixed carboxylic acids is employed as a reactant. Furthermore, the anhydrides of mixed carboxylic acids are not readily available commercially, and require initial preparation. Hence, the production of asymmetrical di-(1-acyloxyaliphatic) ethers containing more than one type of acyloxy radical by the reaction of an aliphatic aldehyde with a mixed carboxylic acid anhydride represents a somewhat more complex and less convenient process.

The reaction between an aliphatic aldehyde and a mono-carboxylic acid anhydride in accordance with this invention is ordinarily carried out in the presence of a catalytic amount of an acidic catalyst if a significant quantity of a di(1-acyloxyaliphatic) ether is to be produced within an efficient period of operation. As employed herein, the term "acidic catalyst" is meant to include substances which, broadly speaking, are strongly acidic materials, such as the inorganic and organic acids characterized by having an ionization constant "K" approximately equal to, or greater than the first ionization constant of phosphoric acid, viz. $7.5 \times 10^{-3}$, the acid-reacting salts of the Friedel-Crafts type, as well as other acid salts which react in situ under the operating conditions utilized to generate strongly acidic materials. Inorganic acids which are suitable for use as a catalyst in accordance with this invention, for example, include sulfuric acid, hydrochloric acid, chlorosulfonic acid, chlorosulfinic acid, hydrobromic acid, hydriodic acid, sulfurous acid, orthophosphoric acid and the like. Organic acids which can be employed as the acidic catalyst include, among others, dichloroacetic acid, trichloroacetic acid, picric acid, arylsulfonic acids such as para-toluenesulfonic acid, and the like. Acid-reacting salts of the Friedel-Crafts type which can be utilized as the acidic catalyst include, among others, zinc chloride, stannic chloride, aluminum chloride, and the like. Other acid salts which can be utilized in this respect include, among others, sodium bisulfate, potassium bisulfate, and the like. In addition, iodine has also been found suitable for use as an acidic catalyst within the scope of this invention.

Of the acidic catalysts, the strong mineral acids find general and preferred usage in accordance with this invention. Of these, the use of sulfuric acid is particularly preferred in that lower concentrations of catalyst can be employed effectively when using sulfuric acid, as compared with the other acidic catalysts. However, the catalyst preference may vary, depending, for example, upon the identity of the aldehyde and/or anhydride undergoing reaction, or upon the operating conditions under which the reaction is carried out. Thus, for example, when an anhydride of an alpha,beta-ethylenically unsaturated monocarboxylic acid is employed as a reactant, the polymerization of the reactant, or of the resulting unsaturated di(1-acyloxyaliphatic) ether product may occur in the presence of the stronger acidic catalysts such as sulfuric acid. Under such conditions, the preferred catalysts are the milder acidic catalysts, such as the aromatic sulfonic acids, The amount of acidic catalyst to be used can be varied widely, and will depend to a certain extent upon the identify of the catalyst, particularly upon the acidic strength of the catalyst, and upon the particular aldehyde and/or anhydride undergoing reaction, as well as upon the operating conditions under which the reaction is carried out. For instance, with the acidic catalysts such as the strong mineral acids, concentrations up to about 2 percent by weight of the total reactants are generally quite effective, while somewhat greater amounts of the less strongly acidic catalysts can be employed advantageously. Little additional advantage may be realized, however, by the use of the acidic catalyst in an amount substantially in excess of about 2 percent by weight of the total reactants. Moreover, such higher catalyst concentrations, while effective, may tend to engender the formation of unwanted by-products. In this respect, a general range within which the concentration of the acidic catalyst can be varied satisfactorily is from about 0.01 percent to about 5 percent by weight of the total reactants, with catalyst concentrations of from about 0.05 percent to about 1 percent by weight of the total reactants being preferred. Somewhat greater or lesser amounts of the acidic catalyst can also be utilized in accordance with this invention, such catalytic amounts being being readily determinable by one skilled in the art in light of this disclosure.

A conventional polymerization inhibitor, such as hydroquinone, an alkyl hydroquinone ether, phenothiazine, tertiary butyl catechol or the like, can also be incorporated in the reaction mixture when desired. The use of a polymerization inhibitor may prove expedient, for example, when an alpha, beta-ethylenically unsaturated monocarboxylic acid anhydride is employed as a reactant. Under such circumstances, the polymerization inhibitor is ordinarily incorporated in the reaction mixture in a concentration of from about 0.01 percent to about 1 percent by weight based upon the weight of the reactants, while higher or lower concentrations in this respect can also be utilized.

An inert diluent for either or both reactants can also be employed if desired, and is in fact preferred if the reactants are not completely miscible under operating conditions, notwithstanding the fact that the presence of a diluent may tend to retard the rate of reaction. Suitable inert diluents include, by way of illustration, dioxane, aliphatic hydrocarbons such as n-heptane, aromatic hydrocarbons such as benzene, ethers such as dibutyl ether and diethylene glycol dimethyl ether, ketones such as acetone, and the like. When desired, the diluent is preferably employed in an amount just sufficient to provide a complete solvent for the reactants, although greater or lesser amounts of diluent can also be utilized.

In the practice of this invention, the reaction between an aliphatic aldehyde and a monocarboxylic acid anhydride is necessarily carried out in a manner assuring the absence of an excess of the anhydride at all times during the course of the reaction. To this end, both the proportions in which the reactants are employed and the method by which the reactants are introduced are of critical importance to the invention. Thus, by way of illustration, particularly good results can be obtained. measurable in terms of high yields and efficiencies, by employing a substantial molar excess of the aldehyde as a reactant, and preferably, a proportion of from about 2 moles to about 10 moles of the aldehyde for each mole of the anhydride undergoing reaction. Higher mole ratios of aldehyde to anhydride can also be utilized, but are generally accompanied by little additional advantage. On the other hand, at least an equimolar ratio of aldehyde or anhydride must be employed. Moreover, the reaction can be performed by either the addition of the anhydride to the aldehyde, or by the simultaneous addition of the reactants to a suitable reactor, in each case employing the reactants in proportions as hereinabove described. However, the addition of the aldehyde to the anhydride, as in the case of using a molar excess of the anhydride as a reactant, has been found unfavorable to the production of di(1-acyloxyaliphatic) ethers and is therefore to be avoided. The acidic catalyst can be introduced to the reaction mixture by incorporation in either or both of the reactants, or, in a less preferred manner due to the exothermic nature of the reaction, by subsequent addition of the catalyst to a mixture of the reactants. Similarly, a polymerization inhibitor and/or diluent, when employed, can be introduced to the reaction mixture with either or both of the reactants, or to a mixture of the reactants.

The practice of adding the anhydride to the aldehyde ordinarily establishes a very high mole ratio of aldehyde to anhydride in the reaction mixture for at least a part of the reaction period, depending upon the rapidity of the addition. Such a procedure therefore generally finds preferred application when a cyclic, polymeric aldehyde, such as paraacetaldehyde, is employed as a reactant or when the acidic catalyst is incorporated in a lower molecular monomeric aldehyde prior to the introduction of the reactants, the presence of the catalyst in such an aldehyde tending to engender the formation of the cyclic, polymeric aldehyde. Under such conditions, the monomeric aldehyde is slowly evolved from the cyclic, polymeric form and care must be taken to see that the anhydride is not added faster than the rate of evolution of the monomeric aldehyde. The simultaneous addition of the reactants to a suitable reactor is, on the other hand, preferred in most other instances. The two reactants may advantageously be mixed and fed as a single stream or, if desired, fed as two separate streams. A particularly preferred procedure in this connection involves the initial preparation of a mixture of all of the aldehyde and a major portion, for example from about 75 percent to about 90 percent, of the anhydride. In the absence of the acidic catalyst, a significant reaction will not occur within this mixture. A second mixture consisting of the remainder of the anhydride and all of the catalyst is also prepared, and the two mixtures subsequently fed to a reactor preferably at constant rates proportional to their volume. The latter procedure ensures the maintenance of a fairly constant mole ratio of the reactants even though the rate of feed of one or both of the mixtures varies slightly, an advantage which does not prevail when the anhydride is added to the aldehyde.

The exothermic reaction between the aliphatic aldehyde and the monocarboxylic acid anhydride in accordance with this invention is quite vigorous and ordinarily takes place as fast as the reactants and the catalyst can be mixed and the heat of reaction removed. Moreover, the reaction is, in most cases, so rapid under the conditions employed that it can be carried out efficiently either batchwise or on a continuous basis. The continuous procedure proves particularly applicable when low molecular weight aldehydes and anhydrides, that is wherein R and $R^1$ defined above in connection with equation I contain up to about three carbon atoms, are employed as reactants.

The temperature of the reaction mixture is generally maintained at a temperature of from a out 0° C., or slightly lower, to about 150° C., or slightly higher, by cooling the reaction mixture using any suitable means and/or by controlling the overall rate of feed of the reactants. Preferably, the temperature of the reaction mixture is maintained in this manner in the range of from about 25° C., to about 100° C. At temperatures substantially below about 0° C., the resulting rate of reaction may be too slow to warrant commercial application of the process, while at temperatures appreciably above about 150° C., undesirable side reactions may occur to an extent such that the yield of the desired product is materially reduced.

Pressure has not been found critical to the reaction. Hence, for example, either atmospheric pressure or superatmospheric pressure can be employed with advantage. In addition, subatmospheric pressure consistent with a predominantly liquid phase reaction can also be employed.

After the feed of the reactants has been completed, the exothermic reaction is ordinarily allowed to continue until the heat of reaction ceases to be evolved. Although the reaction is substantially complete as soon as the reactants and the catalyst have been mixed, it is preferred to permit the reaction mixture to stand for an additional period of from about 1 to about 3 hours or more after the mixing is complete in order to obtain the highest product yields.

Upon completion of the reaction producing the di(1-acyloxyaliphatic) ether, the acid catalyst is generally removed or neutralized by the addition of a suitable agent such as an alkali metal — or ammonium hydroxide, carbonate, bicarbonate or acetate, etc. and the like. A combination of sodium hydroxide and sodium thiosulfate has, for instance, proven particularly effective in the neutialization of a hydriodic acid catalyst. The removal of neutralization of the acidic catalyst in this manner serves, for example, to prevent the reversion of the di(1-acyloxyaliphatic) ether product to the original reactants during subsequent separation. Moreover, if the neutralizing agents are introduced in aqueous solution, the amount of water added should be kept to a minimum so to minimize or obviate the hydrolysis of any unreacted anhydride or of the di(1-acyloxyaliphatic) ether product. Thereafter, the di(1-acyloxyaliphatic) ether produce can be recovered from the neutralized reaction mixture and separated from any unreacted material, as well as any aldehyde 1,1-diacylate which may be produced as a by-product therewith, by any suitable means, such as by vacuum distillation. In this manner, the di(1-acyloxyaliphatic) ether is also separated from any minor quantities of aliphatic acid which may be formed as a by-produce therewith by hydrolysis.

Incorporating, as they do, both ether and ester linkages within the same molecule, the di(1-acyloxyaliphatic) ethers of this invention can be employed as solvents or extractants for many organic compounds, and especially for organic acids and polar substances such as ethylene glycol and ethylene cyanohydrin, etc. and the like. The higher molecular weight di(1-acyloxyaliphatic) ethers may also be used as plasticizers for a wide variety of resins.

Moreover, under certain circumstances, the use of asymmetrical di(1-acyloxyaliphatic) ethers containing more than one type of acyloxy radical may be preferred, as for example, when a solvent or extractant having a particular distribution coefficient for a given material, or a particular boiling point, is desired. However, the production of these asymmetrical di(1-acyloxyaliphatic) ethers by the reaction of an aliphatic aldehyde with an aliphatic or monocyclic aromatic carboxylic acid anhydride as hereinabove described is often inconvenient due both to the commercial unavailability of anhydrides of mixed carboxylic acids and to the fact that the multiplicity of products thereby formed frequently require the use of complex separation techniques.

In accordance with another aspect of this invention, it how now been found that asymmetrical di(1-acyloxyaliphatic) ethers containing more than one type of acyloxy radical can readily be obtained by the predominantly liquid phase reaction of a symmetrical di(1-acyloxyaliphatic) ether with an aliphatic or monocyclic aromatic monocarboxylic acid. The reaction is ordinarily carried out in the presence of a catalytic amount of an acidic catalyst and at a temperature of up to about 150° C.

The production of the asymmetrical di(1-acyloxyaliphatic) ethers from symmetrical di(1-acyloxyaliphatic) ethers in accordance with this invention can be defined more clearly by representation in connection with the following general equation:

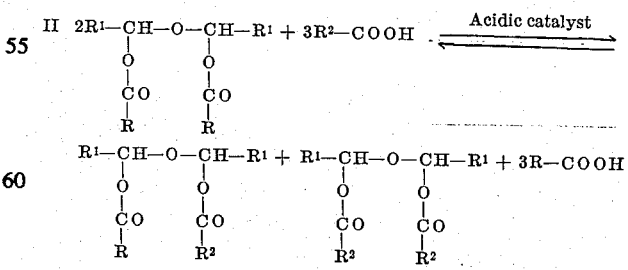

In the equation; R and $R^1$ have the same meanings hereinabove ascribed to the designations in connection with equation I; $R^2$ designates either hydrogen or a member independently selected from the same class of radicals as that designated by R. Thus, it is to be noted that during the course of the reaction, both as asymmetrical di(1-acyloxyaliphatic) ether and a symmetrical di(1-acyloxyaliphatic) ether in which both acyloxy radicals have been replaced are produced. As hereinafter described, the relative proportion of each product in the reaction mixture can generally be controlled or predetermined, principally, for example, by the exercise of control over the mole ratio in which the reactants are introduced.

Moreover, such a process can, if desired, be employed specifically to obtain a symmetrical di(1-acyloxyaliphatic) ether produce in which both acyloxy radicals have been replaced. In this manner, the process provides an expedient route to the production of certain symmetrical di(1-acyloxyaliphatic) ethers which are not as readily produced by the reaction of an aliphatic aldehyde with a monocarboxylic acid anhydride as hereinabove described. Thus, for example the symmetrical di(1-acyloxyaliphatic) ethers containing aromatic or low molecular weight alpha, beta-ethylenically unsaturated aliphatic acyloxy radicals may often be obtained more conveniently, and/or in higher yields, by the reaction of a dissimilar symmetrical di(1-acyloxyaliphatic) ether with an aromatic or low molecular weight alpha, beta-ethylenically unsaturated aliphatic carboxylic acid than by the reaction of an aliphatic aldehyde with the corresponding monocarboxylic acid anhydride. In addition, it can be seen that the process also provides for the production of di(1-acyloxyaliphatic) ethers in which one or both acyloxy radicals are formoxy radicals. Such products, however, could not be prepared directly by the reaction of an aliphatic aldehyde with a monocarboxylic acid anhydride.

As illustrative of the asymmetrical di(1-acyloxyaliphatic) ethers produced in accordance with this invention there can be mentioned the following:

1-formoxy-1'-propionoxydiethyl ether
1-formoxy-1'-(2-ethylhexoxy)diethyl ether
1-acetoxy-1'-(2-ethylbutyroxy)diethyl ether
1-acetoxy-1'-(2-methylpentanoxy)dipropyl ether
1-butyroxy-1'-acetoxydipropyl ether
1-butyroxy-1'-(2-ethylhexoxy)dipropyl ether
1-propionoxy-1'-(3-methoxybutyroxy)di-n-butyl ether
1-(3-methoxybutyroxy)-1'-acetoxydiethyl ether
1-acetoxy-1'-crotonoxydiethyl ether
1-acetoxy-1'-(4-pentenoxy)di(2-methylpentyl)ether
1-acetoxy-1'-(2,4-hexadienoxy) diethyl ether
1-acetoxy-1'-benzoxydiethyl ether
1-propionoxy-1'-pehnylacetoxydiethyl ether
1-acetoxy-1'-toluyloxydipropyl ether, and the like.

In like illustrative manner, the symmetrical di(1-acyloxyaliphatic) ether produces include those symmetrical ethers specifically described hereinabove as being obtainable by the reaction of an aldehyde with a monocarboxylic acid anhydride, and in addition, include di(1-formoxyaliphatic) ethers such as:

di(1-formoxyethyl) ether
di(1-formoxy-2-ethylehexyl) ether
di(1-formoxydodecyl) ether
di (1-formoxy-4-pentenyl) ether, and the like.

As with the symmetrical di(1-acyloxyaliphatic) ethers described in connection with equation I, the symmetrical and asymmetrical ether described in connection with equation II wherein R, $R^1$ and/or $R^2$ designates either an unsaturated aliphatic hydrocarbon radical or an alkoxy-substituted aliphatic hydrocarbon radical, or wherein R and/or $R^2$ designates an aromatic radical, constitute novel compositions of matter.

The symmetrical di(1-acyloxyaliphatic) ethers employed to produce asymmetrical or different symmetrical di(1-acyloxyaliphatic) ethers in accordance with this invention are the same symmetrical di(1-acyloxyaliphatic) ethers hereinabove described as being obtainable by the reaction of an aliphatic aldehyde with a monocarboxylic acid anhydride. Thus, it is to be noted that the concept of this invention defined in connection with Equation II in one important aspect contemplates the same broad class of symmetrical di(1-acyloxyaliphatic) ethers as both reactant material and as a product. Inherently, of course, the specific di(1-acyloxyaliphatic) ethers contemplated as reactant and product are not identical in any given reaction.

The monocarboxylic acids suitable for use in this phase of the invention include formic acid and the aliphatic and monocyclic aromatic monocarboxylic acids of which the corresponding anhydrides are described above as reactants in connection with equation I. Thus, for example, suitable monocarboxylic acid reactants include formic acid, acetic acid, propionic acid, 3-ethoxypropionic acid, butyric acid, 3-methoxybutyric acid, 2-ethylbutyric acid, 2-methylpentanoic acid, 2-ethylhexoic acid, dodecanoic acid, acrylic acid, methacrylic acid, crotonic acid, 2-methylcrotonic acid, 2,4-hexadienoic acid, benzoic acid, ortho-toluic acid, para-methoxybenzoic acid, para-vinylbenzoic acid, phenylacetic acid, phenylbutyric acid, and the like.

The acidic catalysts contemplated in this connection are the same acidic catalysts hereinabove described as being suitable for use in the production of di(1-acyloxyaliphatic) ethers by the reaction of an aldehyde with a monocarboxylic acid anhydride and can be employed in the same concentrations as so described. Thus, the concentration of catalyst to be employed can vary from about 0.01 percent by weight, or slightly less, to about 5 percent by weight of the total reactants, or slightly higher, with catalyst concentrations of from about 0.05 percent to about 1 percent by weight of the total reactants being preferred. The concentration in which the catalyst is employed has not been found to affect the final composition of the reaction mixture, but only the rate at which equilibrium is established.

Moreover, while the preferred catalyst are the strong mineral acids, the selection within this group is particularly influenced by the nature of the reactants. Thus, for example, when formic acid is employed as a reactant, it has been found preferably to avoid the use of a strong acid catalyst such as sulfuric acid so as to obviate the dehydration of the carboxylic acid. Similarly, when an alpha, beta-ethylenically unsaturated monocarboxylic acid is employed as a reactant, the polymerization of the reactant, or the resulting unsaturated di(1-acyloxyaliphatic) ether product, may occur in the presence of the stronger acidic catalysts such as sulfuric acid. Under such conditions, the preferred catalysts are the milder acidic catalysts, such as the aromatic sulfonic acids.

A polymerization inhibitor and/or an inert diluent for either or both of the reactants can also be incorporated in the reaction mixture when desired. Such additives constitute the same materials described above as polymerization inhibitors and inert diluents, respectively, in connection with the production of di(1-acyloxyaliphatic) ethers by the reaction of an aliphatic aldehyde with a monocarboxylic acid anhydride, and are generally employed under the circumstances and in the amounts as so described. Thus, for example, a polymerization inhibitor is generally employed with the di(1-acyloxyaliphatic) ether or monocarboxylic acid reactant possesses an alpha, beta-ethylenically unsaturated acyloxy radical, while an inert diluent finds preferred use when the reactants are not completely miscible under the reaction condition employed.

In practice, the reactants and the catalyst can be brought into admixture in any convenient manner. Thus, the reactants can be introduced simultaneously or consecutively to a suitable reactor. The acidic catalyst can be introduced to the reaction mixture by incorporation in either or both of the reactants, or subsequent to the introduction of the reactants. Similarly, a polymerization inhibitor and/or diluent, when employed, can be introduced to the reaction mixture with either or both of the reactants, or added to a mixture of the reactants.

The mole ratio in which the reactants are employed can be varied broadly, and will, to a certain extent, determine the proportion in which the asymmetrical di(1-acyloxyaliphatic) ether and the symmetrical di(1-acyloxyaliphatic) ether having both acyloxy radicals replaced are obtained as products. Thus, if it is desired to obtain a high yield of an asymmetrical di(1-acyloxyaliphatic) ether in which only one of the acyloxy radicals of the ether reactant is replaced, a mole ratio of the order of up to about 2 moles of the monocarboxylic acid reactant per mole of the starting ether is generally employed. On the other hand, if a high yield of the symmetrical di(1-acyloxyaliphatic) ether in which both acyloxy radicals are replaced is desired, a high mole ratio of greater than 5 moles of the monocarboxylic acid per mole of the ether reactant is generally employed.

Another factor influencing the proportions in which the reactants are to be employed is the relative strength, i.e., dissociation constants, of the monocarboxylic acids concerned. In this respect, it has been found that the proportion of monocarboxylic acid to di(1-acyloxyaliphatic) ether required to effect a substantial replacement of acyloxy radicals varies inversely with the relative strength of the monocarboxylic acid reactant. Thus, for example, if an acetoxy radical is to be replaced by a 2-ethylhexoxy radical, a higher mole ratio of monocarboxylic acid to ether is ordinarily required to achieve a substantial replacement, then if the converse were to be achieved, i.e. the replacement of a 2-ethylhexoxy radical with an acetoxy radical.

Directing an equilibrium reaction by controlling the mole ratio in which the reactants are employed is well known to those skilled in the art. Hence, the proportions in which the reactants are to be employed in accordance with this aspect of the applicants invention can readily be determined by one skilled in the art in light of this disclosure. Broadly speaking, however, the reactants are ordinarily employed in a mole ratio of from about 0.1 to a out 20 moles of the monocarboxylic acid per mole of di(1-acyloxyaliphatic) ether and preferably from about 0.2 to about 5 moles of the monocarboxylic acid per mole of the di(1-acyloxyaliphatic) ether, although proportions outside these ranges can also be utilized.

The reaction temperature to be employed is the same as that hereinabove described in connection with the production of di(1-acyloxyaliphatic) ethers by the reaction of an aliphatic aldehyde with a monocarboxylic acid anhydride. Thus, the reaction temperature can vary from about 0° C., or slightly lower, to about 150° C. or slightly higher, and is preferably in the range of from about 25° C. to about 100° C. At temperatures substantially below about 0° C., the resulting rate of reaction is generally too slow to warrant commercial application of the process, while at temperatures appreciably above about 150° C., undesirable side reactions may occur to an extent such that the yield of the desired product is materially reduced. Similarly, pressure has not been found critical to the process. Hence, for example, either atmospheric pressure or superatmospheric pressure can be employed with advantage, while subatmospheric pressure consistent with a predominantly liquid phase reaction can also be employed.

The period of time during which the reaction is allowed to proceed is preferably sufficient to permit the establishment of an equilibrium degree of reaction, and will vary depending upon the identity and concentration of the reactants and catalyst and upon the reaction temperature. In a highly active system, for example, equilibrium may be established in minutes, while in a less reactive system, the reaction period may extend to 72 hours, or more. Thus, the reaction period to be employed can vary broadly and is readily determinable by one skilled in the art in the light of this disclosure. Moreover, it is to be noted that while the preferred procedure involves the establishment of a substantially equilibrium degree of reaction, the process of this invention can be practiced satisfactorily at lower conversions.

Upon completion of the reaction the acidic catalyst is generally neutralized and the products recovered and separated as described above in connection with the production of di(1-acyloxyaliphatic) ethers by the reaction of an aliphatic aldehyde with a monocarboxylic acid, e.g. by fractional distillation, etc.

In accordance with another aspect of this invention, it has also been found that di(1-acyloxyaliphatic) ethers can be utilized as precursors for a novel class of organic compounds, namely, 1,2-ethylenically unsaturated aliphatic 1-acyloxyaliphatic ethers, by subjecting the di(1-acyloxyaliphatic) ethers to predominantly liquid phase pyrolysis in the absence of a catalyst, and at a temperature of from about 160° C. to about 240° C. This process can be defined more clearly by representation in connection with the following general equation:

$$\text{III} \quad R^1-\underset{\underset{R^2}{\overset{|}{CO}}}{\overset{|}{\underset{|}{O}}}-CH-O-CH-\underset{\underset{R^2}{\overset{|}{CO}}}{\overset{|}{\underset{|}{O}}}-R^1 \longrightarrow$$

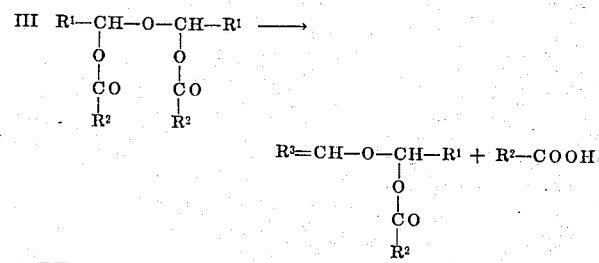

In the equation: $R^1$ and $R^2$ have the same meanings hereinabove ascribed to the designations in connection with equation II, with the additional requirement that at least one radical of the di(1-acyloxyaliphatic) ether designated by $R^1$ must be connected to the adjacent carbon atom by a hydrogen-containing carbon atom, that is, a primary or secondary carbon atom; $R^3$ designates a divalent aliphatic radical, preferably containing from 1 to about 11 carbon atoms. Thus, it can be seen from equation III that the aliphatic radical designated by $R^3$ will contain the same number of carbon atoms as the aliphatic radical designated by $R^1$, from which it is derived, and, it is to be understood, the otherwise identical therewith except for both the nature of the bond by which it is attached to the adjacent carbon atoms and the loss of a hydrogen atom on the carbon atom in the 2-position with respect to the etheric oxygen atom. Hence, for example, when $R^1$ designates a methyl radical, the radical $R^3$ derived therefrom designates a methylene radical which together with the adjacent carbon atom makes up a vinyl radical; when $R^1$ designates a butyl radical, the radical $R^3$ derived therefrom designates a butylidene radical; when $R^1$ designates a 2-ethylhexyl radical, the radical $R^3$ designates a 2-ethylhexylidene radical; when $R^1$ designates a 3-methoxybutyl radical, the radical $R^3$ designates a 3-methoxybutylidene radical; and when $R^1$ designates a 4-pentenyl radical, the radical $R^3$ designates a 4-pentenylidene radical.

The di(1-acyloxyaliphatic) ethers employed in the pyrolysis reaction of this invention are the same di(1-acyloxyaliphatic) ethers produced in accordance with the processes of this invention represented above by equations I and II. It is to be noted further in this respect that upon the pyrolysis of an asymmetrical di(1-acyloxyaliphatic) ether, such as those obtained as hereinabove described by the reaction of a mixture of aliphatic aldehydes and/or an anhydride of mixed monocarboxylic acids, or by the reaction of a symmetrical di(1-acyloxyaliphatic) ether with a monocarboxylic acid containing a different acyloxy radical, the novel 1,2-ethylenically unsaturated aliphatic 1-acyloxyaliphatic ether products of this invention constitute similarly mixed ether derivatives wherein $R^1$, $R^2$ and $R^3$ can each represent more than one type of radical within the meanings hereinabove ascribed thereto.

As illustrative of the 1,2-ethylenically unsaturated aliphatic 1-acyloxyaliphatic ethers produced in accordance with this invention there can be mentioned the following:

vinyl 1-formoxyethyl ether
vinyl 1-acetoxyethyl ether
vinyl 1-propionoxyethyl ether
vinyl 1-(3-ethoxypropionoxy)ethyl ether
vinyl 1-butyroxyethyl ether
vinyl 1-(3-methoxybutyroxy)ethyl ether
vinyl 1-(2-ethylbutyroxy)ethyl ether
vinyl 1-(2-methylpentanoxy)ethyl ether
vinyl 1-(2-ethylhexoxy)ethyl ether
vinyl 1-dodecanoxyethyl ether
vinyl 1-acryloxyethyl ether
vinyl 1-methacryloxyethyl ether
vinyl 1-crotonoxyethyl ether
vinyl 1-(2-methylcrotonoxy)ethyl ether
vinyl 1-(2,4-hexadienoxy)ethyl ether
1-propenyl 1-acetoxypropyl ether
3-ethoxy-1-propenyl 1-acetoxy-3-ethoxypropyl ether
1-propenyl 1-(2-methylpentanoxy)propyl ether
1-propenyl 1-(2-ethylhexoxy) propyl ether
1-isobutenyl 1-acetoxyisobutyl ether
1-butenyl 1-propionoxybutyl ether
3-methoxy-1-butenyl 1-acetoxy-3-methoxybutyl ether
1,4-pentadienyl 1-acetoxy-4-pentenyl ether
1,4 pentadienyl 1-crotonxy-4-pentenyl ether
2-methyl-1-pentenyl 1-acetoxy-2-methylpentyl ether
2-ethyl -1-hexenyl 1-acetoxy-2-ethylhexyl ether
1-butenyl 1-butyroxy-n-butyl ether
1dodecenyl 1-acetoxydodecyl ether
vinyl 1-benzoxyethyl ether
vinyl 1-phenylacetoxyethyl ether
vinyl 1-ortho-toluyloxyethyl ether
vinyl 1-para-methoxybenzoxyethyl ether, and the like.

The production of the 1,2-ethylenically unsaturated aliphatic 1-acyloxyaliphatic ether in accordance with this invention is carried out by heating a di(1-acyloxyaliphatic) ether in the absence of a catalyst and at a temperature maintained generally in the range of from about 160° C. to about 240° C. Preferably, the reaction temperature is maintained between about 180° C. and about 220° C. Slightly higher or lower temperatures can also be employed. However, at temperatures substantially below about 160° C., the resulting rate of pyrolysis is generally too slow to warrant the commercial application of the process, while at temperatures appreciably above about 240° C., undesirable side reactions may occur to an extent such that the yield of the desired product is materially reduced. A polymerization inhibitor such as those hereinabove described can also be incorporated in the reaction mixture, and is particularly desired when the di(1-acyloxyaliphatic) ether undergoing pyrolysis possesses an alpha, beta-ethylenically unsaturated acyloxy radical. Under such circumstances, the polymerization inhibitor is ordinarily incorporated in the reaction mixture in a concentration of from about 0.01 percent to about 1 percent by weight based upon the weight of the reactant, although higher or lower concentrations can also be utilized.

During the pyrolysis reaction, the product, comprising an equimolar mixture of a 1,2-ethylenically unsaturated aliphatic 1-acyloxyaliphatic ether and monocarboxylic acid, is preferably removed from the reaction mixture as rapidly as it is formed or evolved and is subsequently resolved into its individual components without undue delay. A procedure of this nature precludes to a substantial extent the recombination of the ether and acid products which may otherwise occur, especially at elevated temperatures. A particularly convenient and broadly applicable method for resolving the product mixture when a water-soluble acid is present, for example, involves extracting the mixture with water and a suitable hydrocarbon solvent for the ether, such as heptane, benzene, ethyl acetate, chlorinated hydrocarbons such as chloroform, and the like. The ether product can then be recovered from the hydrocarbon layer by conventional distillation. Other convenient methods for resolving the product mixture will occur to those skilled in the art and can readily be employed. When a substantial difference exists between the boiling points of the ether and acid products, the product mixture can also be distilled, ordinarily under reduced pressure, in the absence of any preliminary extraction procedure. Other recovery procedures will also occur to those skilled in the art and can satisfactorily be utilized in accordance with this invention.

In practice, a di(1-acyloxyaliphatic) ether is charged to a suitable reactor, such as a kettle equipped with a distillation column, and is heated therein to a temperature maintained within the operable range hereinabove described. Preferably, the pyrolysis of the di(1-acyloxyaliphatic) ether is carried out by maintaining the reaction temperature within the kettle at about the boiling point of the di(1-acyloxyaliphac) ether. By carrying out the pyrolysis at the boiling point of the di(1-acyloxyaliphatic) ether, the rapid removal of the lower boiling ether and acid products as a distillate during the process can readily be effected. In this connection, a suitable method for controlling the boiling point of the di(1-acyloxyaliphatic) ether within the operable reaction temperature range hereinabove described lies in the control of the pressure maintained within the reaction system. Thus, for example, the pyrolysis of di(1-acetoxyethyl) ether is conveniently conducted at atmospheric pressure since the boiling point of the ether at atmospheric pressure is 190° C., a temperature at which the pyrolysis can be carried out with highly satisfactory results. Higher or lower pressures can also be utilized but preferably are not sufficiently high or low so as to bring the boiling point of the ether reactant outside of the operable temperature range for the reaction. Similarly, di(1-acyloxyaliphatic) ethers of higher molecular weight may require the use of subatmospheric pressure if the reaction is to be conducted at the boiling point of the ether reactant while superatmospheric pressure may best be employed in connection with di(1-acyloxyaliphatic) ethers of lower molecular weight. In addition to carrying out the pyrolysis at the boiling point of the di(1acyloxyaliphatic) ether, it is to be noted that the reaction can be performed at temperatures within the operable range indicated above, and below the boiling point of the di(1-acyloxyaliphatic) ether, by removing the gaseous reaction products using an entraining agent such as an inert gas, as for example, nitrogen, methane, helium, etc. and the like.

The degree of rectification employed in the distillation column should be sufficient to separate the product mixture from unreacted di(1-acyloxyaliphatic) ether which also ascends the distillation column in varying amounts depending upon the operating conditions utilized. However, the degree of rectification preferably should not be sufficient to separate the 1,2-ethylenically unsaturated aliphatic 1-acyloxyaliphatic ether from the monocarboxylic acid produced therewith since one of the components of the product mixture would then be concentrated in the distillation column and eventually forced back into the kettle, thereby resulting in a drop in the kettle temperature. The efficiency of the distillation column and the ratio of reflux required to effect the desired degree of rectification will vary broadly. Good results have been obtained, for example, using distillation columns of from 10 to 30 theoretical plates operating at reflux ratios of from 1 to 1 up to 5 to 1, although the process of the invention is not limited thereto. Upon completion of the reaction, the distillate can be subjected to any of the separation techniques hereinabove described so as to recover a 1,2-ethylenically unsaturated aliphatic 1-acyloxyaliphatic ether as a substantially pure product.

The pyrolysis reaction of this invention can be carried out either batchwise or as a continuous operation. A continuous operation, wherein a di(1-acyloxyaliphatic) ether is continuously fed to a reactor over extended periods of time and subjected to pyrolysis therein, accompanied by the continuous removal of products, represents particularly efficient procedures and is possible on a commercially practicable basis because of the substantially complete conversion of the di(1-acyloxyaliphatic) ether with high efficiency to lower boiling products.

1,2-ethylenically unsaturated 1-acyloxyaliphatic ethers of this invention find use in numerous applications. The products can, for instance be converted to the corresponding novel 1,2-dihaloaliphatic 1-acyloxyaliphatic ether derivatives by conventional reaction with halogenating agents commonly employed for the purpose of adding halogen atoms to an ethylenically unsaturated bond, such as gaseous bromine, chlorine and the like. By way of illustration, typical procedure of this nature are described below in Example XX, XXIII and XXIV, although any other suitable method for adding halogen atoms to an ethylenically unsaturated double bond can be employed. These 1,2dihaloaliphatic 1-acyloxyaliphatic ethers can, in turn, be employed as solvents for a wide variety of organic compounds and are especially useful as solvents for fats and oils.

The novel 1,2-dihaloaliphatic 1acyloxyaliphatic ethers of this invention can be defined more clearly by representation in connection with the following general formula:

IV
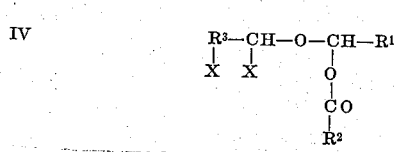

wherein $R^1$, $R^2$ and $R^3$ have the same meanings hereinabove ascribed to the designations in connection with equation III and X designates a halogen atom, such as a bromine or chlorine atom.

As illustrative of the 1,2-diahloaliphatic 1-acyloxyaliphatic ethers of this invention there can be mentioned the following:

1,2-dichloroethyl 1-formoxyethyl ether
1,2-dichloroethyl 1-acetoxyethyl ether
1,2-dibromoethyl 1-acetoxyethyl ether
1,2-dichloropropyl 1-acetoxypropyl ether
1,2-dichloroethyl 1-(2-ethylhexoxy)ethyl ether
1,2-dichloroethyl 1-(3-ethoxypropionoxy)ethyl ether
1,2-dichloro-2-ethylhexyl 1-acetoxyethyl ether
1,2-dichloro-3-butoxybutyl 1-acetoxyethyl ether
1,2-dichloroethyl 1-dodecanoxyethyl ether
1,2-dichloroethyl 1-benzoxyethyl ether, and the like.

It is to be noted, in this connection, that when the 1,2-ethylenically unsaturated aliphatic 1-acyloxyaliphatic ethers which are halogenated to produce the 1,2-dihaloaliphatic 1-acyloxyaliphatic ethers of this invention are also unsaturated in positions other than the 1,2-position indicated above, such additional unsaturated positions may also become halogenated. Such halogenated products, such as 1,2-dichloroethyl 1-(2,3-dichlorobutyroxy)ethyl ether obtained by the chlorination of vinyl 1crotonoxyethyl ether, and 1,2,4,5-tetrabromopentyl 1-acetoxy-4,5-dibromopentyl ether obtained by the bromination of 1,4-pentadienyl 1-acetoxy-4-pentenyl ether, also fall within the contemplation of this invention.

Further, it has been found that the 1,2-ethylenically unsaturated 1-acyloxyaliphatic ethers of this invention are also useful intermediates in the production of asymmetrical di(1-acyloxyaliphatic) ethers from symmetrical di(1-acyloxyaliphatic) ethers. Thus, by reacting the 1,2-ethylenically unsaturated aliphatic 1-acyloxyaliphatic ether with a monocarboxylic acid in which the acyloxy radical differs from that possessed by the ether, in the liquid phase, in the absence of a catalyst and at a temperature of up to about 150° C., an asymmetrical di(1-acyloxyaliphatic) ether is produced. Such a process obviates the use of an acidic catalyst which is otherwise necessary in the conversation of a symmetrical di(1-acyloxyaliphatic) ether to an asymmetrical di(1-acyloxyaliphatic) ether by reaction with a monocarboxylic acid as described above in connection with equation II. Moreover, such a process is specific to the production of an asymmetrical di(1-acyloxyaliphatic) ether, while the process described above in connection with equation II results in the production of both an asymmetrical di(1-acyloxyaliphatic) ether and a symmetrical di(1-acyloxyaliphatic) ether in which both acyloxy radicals have been replaced and are derived from the mono-carboxylic acid reactant. Hence, in the production of asymmetrical di(1-acyloxyaliphatic) ethers by the reaction of a 1,2-ethylenically unsaturated aliphatic 1-acyloxyaliphatic ether with a monocarboxylic acid in accordance with this invention, recovery procedures are considerably simplified and the mole ratio in which the reactants are employed can be varied broadly without significant effect upon the identify of the product.

The latter process can be defined more clearly by representation in connection with the following general equation:

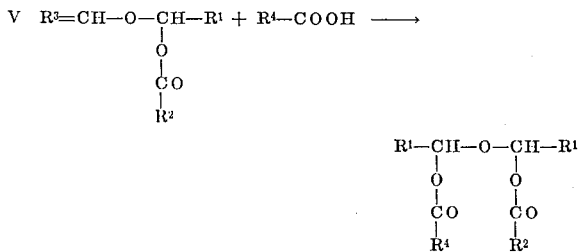

In the equation: $R^1$ and $R^2$ have the same meanings hereinabove ascribed to the designations in connection with equation III: $R^4$ designates a member independently selected from the same class of radicals, including hydrogen, as that designated by $R^2$.

The asymmetrical di(1-acyloxyaliphatic) ethers produced in this manner are the same asymmetrical di(1-acyloxyaliphatic) ethers which can be produced by the reaction of a symmetrical di(1-acyloxyaliphatic) ether with a monocarboxylic acid as described and illustrated in connection with equation II. Similarly, the monocarboxylic acids suitable for use as a reactant are the same monocarboxylic acids reactants described and illustrated in connection with equation II. The 1,2-ethylenically unsaturated aliphatic 1-acyloxyaliphatic ethers employed as a reactant, on the other hand, are the same ethers produced by the pyrolysis of di(1-acyloxyaliphatic) ethers as described and illustrated in connection with equation III.

In practice, the 1,2 -ethylenically unsaturated 1-acyloxyaliphatic ether and the monocarboxylic acid are admixed in any convenient manner in the absence of a catalyst. By way of illustration, the reactants can be introduced simultaneously or consecutively to a suitable reactor.

The mole ratio in which the reactants are employed can be varied broadly. Thus, although the ether reacts stoichiometrically in equimolar proportions with the monocarboxylic acid to produce an asymmetrical di(1-acyloxyaliphatic) ether, an excess of either reactant can also be employed. Generally, for example, either reactant can be employed in a mole ratio of from about 0.1 : 1 to about 10 : 1, and is preferably employed in a mole ratio of from about 0.5 : 1 to about 2 :1, with respect to the other reactant. Proportions outside this range can also be also utilized, although accompanied by little or no additional advantage.

The preferred mole ratio in which the reactants are employed will depend to a certain extent upon the molecular weight or activity of the reactants. For instance, acetic acid will add to a given 1,2-ethylenically unsaturated aliphatic 1-acyloxyaliphatic ether more readily than will 2-ethylhexanoic acid. Similarly, a given monocarboxylic acid will add more readily to a vinyl 1-acyloxyaliphatic ether than to a 1-butenyl 1-acyloxyaliphatic ether. When both reactants are of low molecular weight, their use in an equimolar ratio will ordinarily result in a high degree of conversion of both reactants.

A polymerization inhibitor and/or an inert diluent for either or both of the reactants, such as those hereinabove described, can also be incorporated in the reaction mixture when desired. A polymerization inhibitor may find use, for example, when either the ether or monocarboxylic acid reactant possess alpha, beta-ethylenically unsaturated acyloxy radicals, while an inert diluent may find use when the reactants are not completely miscible under the reaction condition employed. When utilized, the polymerization inhibitor and/or the inert diluent can be introduced to the reaction mixture with either or both of the reactants, or added to a mixture of the reactants, and are ordinarily employed in concentrations such as those hereinabove described with reference to their use in connection with equation I.

The reaction between the 1,2-ethylenically unsaturated aliphatic 1-acyloxyaliphatic ether and the monocarboxylic acid is often exothermic and may require cooling in large scale production in order to remove the heat of reaction. The temperature of the reaction mixture is generally maintained in the range of from about 0° C. to about 150° C. and preferably in the range of from about 50° C. to about 120° C. Somewhat lower reaction temperatures can be employed although accompanied by low reaction rates and/or reduced yields. On the other hand, temperatures substantially above about 150° C. have been found to engender a reversal of the reaction, as indicated above in connection with the process represented by equation III. Thus, since the di(1-acyloxyaliphatic) ether cannot readily be removed from the reaction mixture during the course of the reaction so as to direct the equilibrium to the production of the desired asymmetrical di(1-acyloxyaliphatic) ethers, such higher reaction temperatures are to be avoided in the practice of this aspect of the applicant's invention.

Pressure has not been found critical to the process. Hence, either atmospheric or superatmospheric pressure can be employed. In addition, subatmospheric pressure consistent with a predominantly liquid phase reaction can also be utilized.

The reaction time can be varied broadly and depends in part, for example, upon the nature of the reactants, the mole ratio in which the reactants are employed and the reaction temperature. Thus, while under certain operating conditions, a substantially complete reaction may be realized in a matter of 1 or more minutes, reaction periods of up to about 50 hours or more can also be utilized.

Upon completion of the reaction, the asymmetrical di(1-acyloxyaliphatic) ether produce can be separated and recovered by any of the techniques hereinabove described, e.g. fractional distillation, etc.

In still another aspect of the prevent invention, it has been found that the 1,2-ethylenically unsaturated aliphatic 1-acyloxyaliphatic ether products of this invention can be polymerized to form novel solid homopolymer resins characterized by repeating units represented by the structure VI 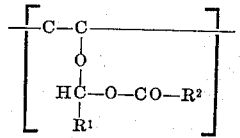

wherein $R^1$ and $R^2$ have the same meaning hereinabove ascribed to the designations in connection with equations II and III. In addition, it has been found that the di(1-acyloxyaliphatic) ethers containing at least one alpha, beta-ethylenically unsaturated aliphatic acyloxy radical can also be polymerized to form novel solid homopolymer resins characterized by repeating units having the structure VII 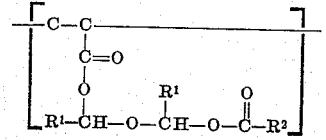

wherein $R^1$ and $R^2$ have the same meanings hereinabove ascribed to the designations in connection with equations II and III.

The polymerization reactions can be carried out for example, in accordance with conventional processes for the polymerization of ethylenically unsaturated monomers by contacting the monomer with a Friedel-Crafts catalyst, such as boron trifluoride, aluminum trichloride and the like, or a free radical catalyst such as benzoyl peroxide, etc. at a temperature and for a period of time sufficient to produce a polymeric product. Typical procedures of this nature are illustrated below by description in Examples XXXIV to XL although any other suitable method can be employed. The homopolymer resins thereby formed may subsequently find satisfactory use as coatings and in the formation of laminated products.

The present invention, in its various aspects, can be illustrated further in connection with the following specific examples of its practice, which, it is to be noted, are not intended to limit the invention.

EXAMPLE I

A mixture was prepared containing 1778 grams (40.4 moles) of acetaldehyde and 1,825 grams (17.9 moles) of acetic anhydride, each component having been cooled prior to admixture to a temperature of 0° C. Another mixture was prepared by adding 9.2 grams of 95 percent sulfuric acid to 603 grams (5.9 moles) of acetic anhydride. At a rate proportional to their volumes, the two mixtures were then fed simultaneously into a glass flask equipped with a stirrer, thermometer and brine-cooled reflux condenser, and which was surrounded by a water bath. An exothermic reaction occurred upon the introduction of the mixture into the flask and the temperature of the reaction mixture rose rapidly to 50° C. With the temperature of the water bath maintained at 20° C. the rates of feed of the two mixtures were adjusted so as to maintain the temperature of the reaction mixture between 45° and 50° C. The feeding of the reactants was completed in 45 minutes. The reaction was allowed to continue with stirring for an additional 35 minutes at temperature maintained between 40° and 60° C. The sulfuric acid was then neutralized by the addition of 20 grams of 50 percent aqueous sodium hydroxide, after which the crude reaction product was subjected to fractional distillation under reduced pressure. The still column employed for the distillation was 41 millimeters in diameter, 48 inches in length and packed with 0.16 inch by 0.16-inch protruded packing. The distillation was started under an absolute pressure of 200 millimeters of mercury, and the pressure gradually decreased during the course of the distillation to a minimum pressure of 10 millimeters of mercury. The products from the distillation included 711 grams (16.2 moles) of acetaldehyde and paraacetaldehyde, 801 grams (7.9 moles) of acetic anhydride, 152 grams (2.5 moles) of acetic acid, 560 grams (3.8 moles) of ethylidene diacetate and 1826 grams (9.6 moles) of di(1-acetoxyethyl) ether. The conversion of acetaldehyde was 66.7 percent, while that of acetic anhydride was 66.9 percent. The efficiencies based on acetaldehyde were 79.3 percent to di(1-acetoxyethyl) ether and 15.8 percent to ethylidene diacetate. Based on acetic anhydride, the efficiencies were 60.4 percent to di(1-acetoxyethyl) ether and 24.1 percent to ethylidene diacetate. The di(1-acetoxyethyl) ether product had an indicated purity of more than 99 percent and had the following physical properties: a boiling point of 80° C. at an absolute pressure of 10 millimeters of mercury, a specific gravity of 1.069 at 20/20° C. and a refractive index of 1.4081 at a temperature of 20° C. Corresponding physical property values for the ethylidene diacetate were 60° C., 1.076 and 1.4015, respectively

EXAMPLE II

In a manner and using equipment similar to that described in Example I, except where otherwise indicated below, a series of experiments was conducted utilizing various aliphatic aldehydes and anhydrides of monocarboxylic acids as reactants, and utilizing various acidic catalysts. In run Nos. 1 to 20, two mixtures were prepared, one containing all of the aldehyde together with three-fourths of the anhydride, and a second containing the remaining anhydride and the catalyst. The two mixtures were then fed simultaneously to the reaction vessel at rates proportional to their volumes. In run No. 21, the anhydride was fed to a solution of all of the catalyst in all of the aldehyde. In run Nos. 22 to 24, the aldehyde was fed to a solution of all of the catalyst in all of the anhydride. Upon completion of each reaction, the acidic catalyst was neutralized and the crude product resolved by distillation into its component constituents. The reactants and catalyst employed, the concentrations used, and the results obtained in each run are tabulated below in Table A. The operating conditions employed in each run are tabulated below in Table B. In Table A, the concentration of catalyst is indicated in percent by weight based upon the weight of the reactants, the product ratio indicates the moles of di(1-acyloxyaliphatic) ether produced per mole of aldehyde 1,1-dicaylate. In Table B, the mixing temperature and time indicates, respectively, the temperature maintained in the reactor during the feeding of the reactants and the time during which such feeding took place; the additional reaction temperature and time indicates, respectively, the temperature maintained in the reactor after feeding was completed and the period of time after such feeding that the reaction was allowed to continue.

TABLE A

| Run No. | Reactants - Aldehyde Name | Reactants - Aldehyde Moles | Reactants - Anhydride Name | Reactants - Anhydride Moles | Catalyst Name | Catalyst Conc., percent | Product composition - Based on aldehyde percent efficiency to - Aldehyde 1,1-diacylate | Product composition - Based on aldehyde percent efficiency to - Di(1-acyloxy-aliphatic) ether | Product composition - Based on anhydride percent efficiency to - Aldehyde 1,1-diacylate | Product composition - Based on anhydride percent efficiency to - Di(1-acyloxy-aliphatic) ether | Product ratio |
|---|---|---|---|---|---|---|---|---|---|---|---|
| 1 | Acetaldehyde | 1.1 | Acetic | 1.0 | Sulfuric acid | 0.3 | 25.0 | 64.7 | 39.2 | 51.0 | 1.3 |
| 2 | do | 1.1 | do | 1.0 | do | 0.3 | 23.0 | 61.0 | 38.3 | 50.0 | 1.3 |
| 3 | do | 1.1 | do | 1.0 | do | 0.3 | 21.7 | 63.0 | 34.1 | 51.5 | 1.5 |
| 4 | do | 1.1 | do | 1.0 | do | 0.3 | 23.0 | 44.5 | 41.0 | 39.3 | 1.0 |
| 5 | do | 2.5 | do | 1.0 | do | 0.05 | 11.5 | 77.9 | 22.1 | 75.0 | 3.4 |
| 6 | do | 3.0 | do | 1.0 | do | 0.2 | 11.2 | 72.4 | 19.5 | 62.0 | 3.2 |
| 7 | do | 1.7 | do | 1.0 | do | 0.3 | 15.0 | 67.3 | 24.8 | 55.8 | 2.2 |
| 8 | do | 1.7 | do | 1.0 | Chloro-sulfonic acid | 0.06 | 12.5 | 71.6 | 21.0 | 60.5 | 2.9 |
| 9 | do | 2.0 | do | 1.0 | do | 0.2 | 12.0 | 75.6 | 21.3 | 68.3 | 3.2 |
| 10 | do | 2.0 | do | 1.0 | Paratoluene-sulfonic acid | 0.2 | 16.8 | 77.7 | 28.2 | 65.1 | 2.3 |
| 11 | do | 2.0 | do | 1.0 | Phosphoric acid | 0.2 | 12.9 | 82.0 | 18.4 | 59.0 | 4.7 |
| 12 | do | 2.0 | do | 1.0 | Iodine | 0.8 | 4.3 | 40.6 | 6.6 | 31.4 | 1.5 |
| 13 | do | 2.0 | do | 1.0 | Zinc chloride | 0.1 | 24.2 | 74.3 | 35.5 | 55.5 | 1.6 |
| 14 | do | 2.0 | do | 1.0 | Sulfuric acid | 0.3 | 19.7 | 63.3 | 34.6 | 55.5 | 1.6 |
| 15 | do | 2.0 | do | 1.0 | do | 0.2 | 14.9 | 69.7 | 26.2 | 61.5 | 2.3 |
| 16 | do | 2.0 | do | 1.0 | do | 0.3 | 10.0 | 64.1 | 18.7 | 59.0 | 2.6 |
| 17 | n-Butyraldehyde | 1.7 | Propionic | 1.0 | do | 0.3 | 15.6 | 80.0 | 15.3 | 41.0 | 2.0 |
| 18 | Isobutraldehyde | 1.7 | 2-ethylbutyric | 1.0 | do | 0.3 | 18.1 | 71.0 | 28.8 | 56.4 | 2.5 |
| 19 | 2-methylpentanal | 2.0 | Propionic | 1.0 | do | 0.4 | 21.2 | 65.7 | 26.8 | 41.4 | 1.5 |
| 20 | 2-ethylhexaldehyde | 2.0 | Acetic | 1.0 | do | 0.2 | 17.8 | 37.2 | 20.9 | 21.7 | 1.0 |
| 21 | Paraacetaldehyde | 4.0 | do | 1.0 | do | 0.2 | 10.2 | 69.3 | 20.0 | 68.0 | 3.4 |
| 22 | Acetaldehyde | 0.8 | do | 1.0 | do | 0.2 | 44.5 | 29.1 | 60.8 | 19.3 | 0.3 |
| 23 | do | 1.0 | Crotonic | 1.0 | do | 0.2 | 37.3 | Nil | 48.0 | Nil | Nil |
| 24 | Isobutyraldehyde | 1.0 | Acetic | 1.0 | do | 0.2 | 64.6 | 17.2 | 65.0 | 8.8 | 0.13 |

TABLE B

| Run No. | Mixing Temp. (°C) | Time (Hrs) | Additional Reaction Temp. (°C) | Time (Hrs) |
|---|---|---|---|---|
| 1 | 45 | 0.7 | 30 | 18 |
| 2 | 45 | 0.7 | 40 | 0.2 |
| 3 | 70 | 0.5 | 70 | 0.2 |
| 4 | 20 | 1 | 20 | 4 |
| 5 |  | 1.5 | 40 | 2.0 |
| 6 | 39 | 0.7 | 45 |  |
| 7 | 55 |  | 40 | 0.3 |
| 8 | 50 | 0.3 | 40 | 2.5 |
| 9 | 25 | 1.3 | 25 |  |
| 10 | 45 | 0.7 | 70 | 2.0 |
| 11 | 35 | 3.0 | 25 | 16.0 |
| 12 | 32 | 0.7 | 35 |  |
| 13 | 50 | 1.0 | 45 | 1.5 |
| 14 | 50 | 1.0 | 45 | 1.0 |
| 15 | 50 | 1.0 | 60 | 4.0 |
| 16 | 40 | 0.9 | 25 | 16.0 |
| 17 | 50 | 0.7 | 45 |  |
| 18 | 50 | 0.7 | 40 | 2.0 |
| 19 | 50 | 1.0 | 40 |  |
| 20 | 55 | 2.0 | 60 | 3.0 |
| 21 | 40 | 3.5 | 40 | 3.0 |
| 22 | 40 | 2 | 25 | 16.0 |
| 23 | 30 | 0.5 | 25 | 4.0 |
| 24 | 40 | 1.5 | 30 | 16.0 |

From the above Tables, the importance to this invention of maintaining at least a stoichiometric amount, and preferably a molar excess, of the aldehyde in the reaction mixture at all times during the reaction can readily be seen. Thus, for instance, when an excess of the anhydride is employed, or when the aldehyde is fed to the anhydride as in run nos. 22 to 24, any di(1-acyloxyaliphatic) ether formed represents no more than a minor product, whereas a di(1-acyloxyaliphatic) ether is obtained as the major product in accordance with the process of this invention.

Similar experiments were conducted in which acrolein, crotonaldehyde, 2-methyl-2-pentenal and benzaldehyde were employed as the aldehyde reactant. In each instance, an aliphatic diacylate was formed as the major product and a di(1-acyloxyaliphatic) ether was not obtained.

EXAMPLE III

In a manner and using equipment similar to that described in Example I, acetaldehyde and 3-ethoxypropionic anhydride were reacted using a mole ratio of 2.5 moles of aldehyde per mole of aldehyde per mole of anhydride and using a sulfuric acid catalyst in a concentration of 0.3 percent by weight of the catalyst based upon the weight of the reactants. The feeding of the reactants was carried out over a period of about 45 minutes, during which time, the temperature of the reaction mixture was maintained at about 50° C. Thereafter, the reaction was allowed to continue for an additional period of 2 hours at a temperature of about 40° C. Upon completion of the reaction period, the acid catalyst was neutralized by the addition of sodium hydroxide and the crude product resolved under reduced pressure into its component parts by fractional distillation. The products recovered in this manner included both di[1-(3-ethoxypropionoxy)-ethyl] ether as the major product and 1,1-di(3-ethoxypropionoxy)ethane, such products having been formed in a di(1-acyloxyaliphatic) ether to 1,1-aldehyde diacylate mole ratio of 1.2:1. The conversion of acetaldehyde was 43.5 percent, while that of 3-ethoxypropionic anhydride was 89.4 percent. The efficiencies based on acetaldehyde were 51.8 percent to di[1-(3-ethoxypropionoxy)ethyl] ether and 21.7 percent to 1,1-di(3-ethoxypropionoxy)ethane. Based on 3-ethoxypropionic anhydride, the corresponding efficiencies were 34.8 percent and 29.2 percent respectively. The di[1-(3-ethoxypropionoxy)-ethyl] ether product had an indicated purity of 99.5 percent and had the following physical properties: a boiling point of 114° C. at an absolute pressure of 0.5 millimeter of mercury, a specific gravity of 1.049 at 20/20° C. and a refractive index of 1.4278 at a temperature of 20° C.

EXAMPLE IV

In a manner and using equipment similar to that described in Example I, acetaldehyde and crotonic anhydride were reacted using a mole ratio of 2.5 moles of aldehyde per mole of anhydride and using a sulfuric acid catalyst in a concentration of 0.2 percent by weight of the catalyst based upon the weight of the reactants. The feeding of the reactants was carried out over a period of about 30 minutes, during which time the temperature of the reaction mixture was maintained at about 50° C. Thereafter, the reaction was allowed to continue for an additional period of 3 hours at a temperature of about 40° C. Upon completion of the reaction period, the acid catalyst was neutralized by the addition of sodium hydroxide and the crude reaction product resolved into its component parts by fractional distillation under reduced pressure. The products recovered in this manner included both di(1-crotonoxyethyl) ether as the major product and 1,1-dicrotonoxyethane, such products having been formed in a di(1-acyloxyaliphatic) ether to 1,1-aldehyde diacylate mole ratio of 1.4 : 1. The conversion of acetaldehyde was 50.5 percent, while that of crotonic anhydride was 98.7 per cent. The efficiencies based on acetaldehyde was 58.0 percent to di(1-crotonoxyethyl) ether and 20.6 per cent to 1,1-dicrotonoxyethane. Based on crotonic anhydride, the corresponding efficiencies were 37.4 percent and 26.6 percent, respectively. The di(1-crotonoxyethyl) ether product had an indicated purity of 98.5 percent and had the following physical properties: a boiling point of 98° C. at an absolute pressure of 0.6 millimeter of mercury, a specific gravity of 1.045 at 20/20° C. and a refractive index of 1.4550 at a temperature of 20° C. Corresponding physical property values for the 1,1-dicrotonoxyethane were 89° C. (at an absolute pressure of 0.7 millimeter of mercury), 1.044 and 1.4601, respectively. Di(1-crotonoxyethyl) ether was also found to be an effective solvent for a wide variety of organic compounds, including many aliphatic and aromatic carboxylic acids and ethers.

EXAMPLE V

In a manner and using equipment similar to that described in Example I, 4-pentenal and acetic anhydride were reacted using a mole ratio of 1.7 moles of aldehyde per mole of anhydride and using a sulfuric acid catalyst in a concentration of 0.3 per cent by weight of the catalyst based upon the weight of the reactants. The feeding of the reactants was carried out over a period of about 30 minutes, during which time the temperature of the reaction mixture was maintained at about 55° C. Thereafter, the reaction was allowed to continue for an additional period of 16 hours at a temperature of about 30° C. Upon completion of the reaction period, the acid catalyst was neutralized by the addition of sodium hydroxide and the crude reaction product resolved into its component parts by fractional distillation under reduced pressure. The products obtained in this manner included both di(1-acetoxy-4-pentenyl) ether as the major product and 1,1-diacetoxy-4-pentene, such products having been formed in a di(1-acyloxyaliphatic) ether to 1,1-aldehyde di-acylate mole ratio of 3.2 : 1. The conversion of 4-pentenal was 89.5 percent, while that of acetic anhydride was 85.0 percent. The efficiencies based on 4-pentenal were 52.2 percent to di(1-acetoxy-4-pentenyl) ether and 10.0 percent to 1,1-diacetoxy-4-pentene. Based on acetic anhydride, the corresponding efficiencies were 49.0 per cent and 38.0 per cent, respectively. The di(1-acetoxy-4-pentenyl) ether product had an indicated purity of 99.5 percent and had the following physical properties: a boiling point of 90° C. at an absolute pressure of 0.5 millimeter of mercury, a specific gravity of 1.021, at 20/20° C. and a refractive index of 1.4426 at a temperature of 20° C. Corresponding physical property values for the 1,1-diacetoxy-4-pentene were 54° C., 1.031 and 1.4286, respectively.

EXAMPLE VI

In a manner and using equipment similar to that described in Example I, 3-methoxybutyraldehyde and acetic anhydride were reacted using a mole ratio of 1.7 moles of aldehyde per mole of anhydride and using a sulfuric acid catalyst in a concentration of 0.2 percent by weight of the catalyst based upon the weight of the reactants. The feeding of the reactants was carried out over a period of about 60 minutes, during which time the temperature of the reaction mixture was maintained at about 35° C. Thereafter, the reaction was allowed to continue for an additional period of 5 hours at a temperature of about 30° C. Upon completion of the reaction period, the acid catalyst was neutralized by the addition of sodium hydroxide and the crude reaction product resolved into its component parts by fractional distillation under reduced pressure. The products obtained in this manner included both di(1-acetoxy-3-methoxybutyl) ether as the major product and 1,1-diacetoxy-3-methoxybutane, such products having been formed in a di(1-acyloxyaliphatic) ether to 1,1-aldehyde diacylate mole ratio of 1.4 : 1. The conversion of 3-methoxybutyraldehyde was 72.0 per cent, while that of acetic anhydride was 67.2 percent. The efficiencies based on 3-methoxybutyraldehyde were 50.8 percent to di(1-acetoxy-3-methoxybutyl) ether and 18.8 percent to 1,1-diacetoxy-3-methoxybutane. Based on acetic anhydride the corresponding efficiencies were 46.5 percent and 34.3 percent, respectively. The di(1-acetoxy-3-methoxybutyl) ether product had an indicated purity of 98.5 percent and had the following physical properties: a boiling point of 118° C. at an absolute pressure of 1 millimeter of mercury, a specific gravity of 1.050, at 20/20° C. and a refractive index of 1.4304 at a temperature of 20° C. Corresponding values for the 1,1-diacetoxy-3-methoxybutane were 90° C. at an absolute pressure of 3 millimeters of mercury, 1.062, and 1.4178, respectively.

EXAMPLE VII

Acetaldehyde and acetic anhydride were reacted continuously in a coil-type reactor. The reactor consisted of 39 feet of copper tubing having an outside diameter of ¼-inch. The coil was 4 inches in diameter and was contained in a metal jacket through which exhaust steam was blown at a high rate, thus ensuring an internal temperature of about 100° C. The pressure inside the coil was maintained at 125 pounds per square inch gauge. Two feed mixtures were prepared, the first consisting of 2 moles of acetaldehyde and 0.75 mole of acetic anhydride, and the second of 0.25 mole of acetic anhydride and a quantity of sulfuric acid equal to 0.06 per cent by weight based upon the weight of the reactants. The two mixtures were pumped simultaneously through a mixing device at a temperature of 25° C. and then into the reaction coil at rates proportional to their total volumes. The contact time in the coil was 6 minutes. As the reaction mixture emerged from the coil it was cooled to a temperature of 25° C. and the sulfuric acid catalyst immediately neutralized by the addition of aqueous sodium hydroxide, after which the reaction mixture was distilled. The conversions were 43.3 percent of the acetaldehyde and 53.5 per cent of the acetic anhydride. Based on acetaldehyde the efficiencies were 83.3 percent to di(1-acetoxyethyl) ether and 10.1 percent to ethylidene diacetate. Based on acetic anhydride the efficiencies were 65.3 percent to di(1-acetoxyethyl) ether and 15.8 percent to ethylidene diacetate.

Based upon the low mutual solubility of di(1-acetoxyethyl) ether and water, 2.7 grams of the ether being soluble in 100 milliliters of water and 1.9 grams of water being soluble in 100 milliliters of ether at a temperature of 25° C., and based further upon the demonstrated affinity of the enter for organic acids, the ether was determined to be an excellent solvent for extracting water-soluble organic acids from aqueous solutions. The ether was, for example, found to be superior to a conventional solvent, viz. isopopyl ether, with regard to the extraction of acrylic acid from water, the distribution coefficients for these two extractants in such a system being 1.86 and 1.60, respectively.

EXAMPLE VIII

To a 3-liter distillation flask, equipped with a stirrer and thermometer and surrounded by a heating mantle, there were charged 818 grams (4.3 moles) of di(1-acetoxyethyl) ether, 999 grams (8.6 moles) of 2-ethylbutyric acid and 5.5 grams of 95 percent sulfuric acid. The mixture in the flask was then heated with stirring to a temperature of 50° C. and maintained at that temperature for a period of 1 hour. The sulfuric acid was subsequently neutralized by the addition of 12 grams of 50 percent aqueous sodium hydroxide, after which the crude reaction product was resolved into its component parts by fractional distillation under reduced pressure using a still column 41 millimeters in diameter, 40 inches in length, and packed with 0.16-inch by 0.16-inch protruded packing. The products recovered in this manner included 455 grams (1.85 moles) of 1-acetoxy-1'-(2-ethylbutyroxy) diethyl ether and 338 grams (1.12 moles) of di[1-(2-ethylbutyroxy) ethyl]ether. Also recovered were 220 grams (1.16 moles) of unreacted di(1-acetoxyethyl) ether, 504 grams (4.35 moles) of unreacted ethylbutyric acid and 264 grams (4.4 moles) of acetic acid. The 1-acetoxy-1'-(2-ethylbutyroxy)diethyl ether product had an indicated purity greater than 99 percent and had the following physical properties: a boiling point of 87° C., at an absolute pressure of 1 millimeter of mercury, a specific gravity of 0.985 at 20/20° C., and a refractive index of 1.4185 at a temperature of 20° C.

EXAMPLE IX

In a manner and using equipment similar to that described in Example VIII, 1 mole of di(1-acetoxyethyl) ether was reacted with 2 moles of crotonic acid using a sulfuric acid catalyst in a concentration of 0.3 percent by weight of the reactants. The reaction mixture was heated to, and maintained at a temperature of 55° C. for a period of 1 hour. Upon completion of the reaction period, the acid catalyst was neutralized and the crude reaction product resolved into its component parts by fractional distillation under reduced pressure. The products recovered in this manner included 0.49 mole of 1-acetoxy-1'-crotonoxydiethyl ether and 0.32 mole of di(1-crotonoxyethyl) ether. Also recovered were 0.17 mole of unreacted di(1-acetoxyethyl) ether, 0.82 mole of unreacted crotonic acid and 1.16 moles of acetic acid. The 1-acetoxy-1'-crotonoxydiethyl ether product had an indicated purity of 99.6 percent and had the following physical properties: a boiling point of 94° C. at an absolute pressure of 3 millimeters of mercury, a specific gravity of 1.037 at 20/20° C., and a refractive index of 1.4585 at a temperature of 20° C.

EXAMPLE X

In a manner and using equipment similar to that described in Example VIII, 1 mole of di(1-propionoxyethyl) ether was reacted with 0.9 mole of anhydrous formic acid using a para-toluenesulfonic acid catalyst in a concentration of 0.2 percent by weight of the catalyst based upon the weight of the reactants. The reaction mixture was maintained at a temperature of 25° C. for a period of 16 hours. Upon completion of the reaction period, the acid catalyst was neutralized by the addition of sodium hydroxide and the crude reaction product resolved into its component parts by fractional distillation under reduced pressure. The products recovered in this manner included 0.42 mole of 1-formoxy-1'-propionoxydiethyl ether and 0.2 mole of di(1-formoxy-ethyl) ether. Also recovered were 0.35 mole of unreacted di(1-propionoxyethyl) ether, 0.05 mole of unreacted formic acid and 0.85 mole of propionic acid. The 1-formoxy-1'-propionoxydiethyl ether product had an indicated purity of 100.5 percent and had the following physical properties: a boiling point of 77° C. at an absolute pressure of 7 millimeters of mercury, a specific gravity of 1.071 at 20/20° C., and a refractive index of 1.4098 at a temperature of 20° C. The di(1-formoxyethyl) ether had an indicated purity of 100.8 percent and had the following physical properties: a boiling point of 65° C. at an absolute pressure of 9 millimeters of mercury, a specific gravity of 1.131 at 20/20° C., and a refractive index of 1.4051 at a temperature of 20° C.

EXAMPLE XI

In a manner and using equipment similar to that described in Example VIII, 1 mole of di[1-(2-methylpentanoxy)-propyl] ether was reacted with 2.0 moles of acetic acid using a sulfuric acid catalyst in a concentration of 0.3 percent by weight of the catalyst based upon the weight of the reactants. The reaction mixture was heated to, and maintained at a temperature of 100° C. for a period of 1 hour. Upon completion of the reaction period, the acid catalyst was neutralized by the addition of anhydrous sodium acetate and the crude reaction product resolved into its component parts by fractional distillation under reduced pressure. The products recovered in this manner included 0.39 mole of 1-acetoxy-1'-(2-methylpentanoxy) dipropyl ether and 0.36 mole of di(1-acetoxypropyl) ether. Also recovered were 0.23 mole of unreacted di[1-(2-methylpentanoxypropyl] ether, 0.83 mole of unreacted acetic acid and 1.05 moles of 2-methylpentanoic acid. The 1-acetoxy-1'-(2-methylpentanoxy)-dipropyl ether product had an indicated purity of 98 per cent and had the following physical properties: a boiling point of 88° C. at an absolute pressure of 0.9 millimeters of mercury and a refractive index of 1.4226 at a temperature of 20° C.

EXAMPLE XII

In a manner and using equipment similar to that described in Example VIII, 2 moles of di(1-acetoxy-2-methylpentyl) ether was reacted with 1 mole of 4-pentenoic acid using an orthophosphoric acid catalyst in a concentration of 0.35 percent by weight of the catalyst based upon the weight of the reactants. Phenothiazine was also incorporated in the reaction mixture in a concentration of 0.05 percent by weight based upon the weight of the reactants. The reaction mixture was maintained at a temperature of 25° C. for a period of 72 hours. Upon completion of the reaction period, the acid catalyst was neutralized by the addition of anhydrous sodium acetate and the crude reaction product resolved into its component parts by fractional distillation under reduced pressure. The products recovered in this manner included 0.33 mole of 1-acetoxyl-1'-(4-pentenoxy)di(2-methylpentyl) ether and 0.05 mole of di[1-(4-pentenoxy)-2-methylpentyl] ether. Also recovered were 1.57 moles of unreacted di(1-acetoxy-2-methylpentyl) ether, 0.53 mole of unreacted 4-pentenoic acid and 0.44 mole of acetic acid. The 1-acetoxy-1'-(4-pentenoxy)di(2-methylpentyl) ether product had an indicated purity of 98 percent and had the following physical properties: a boiling point of 127° C. at an absolute pressure of 0.4 millimeters of mercury, a specific gravity of 0.948 at 20/20° C., and a refractive index of 1.4372 at a temperature of 20° C.

EXAMPLE XIII

In a manner and using equipment similar to that described in Example VIII, 1 mole of di(1-propionoxy-n-butyl) ether was reacted with 3.2 moles of 3-methoxybutyric acid using a sulfuric acid catalyst in a concentration of 0.24 percent by weight of the catalyst based upon the weight of the reactants. The reaction mixture was heated to, and maintained at a temperature of 60° C. for a period of 3 hours. Upon completion of the reaction period, the acid catalyst was neutralized by the addition of anhydrous sodium acetate and the crude reaction product resolved into its component parts by fractional distillation under reduced pressure. The products recovered in this manner included 0.26 mole of 1-propionoxy-1'-(3-methoxy-butyroxy)di-n-butyl ether and 0.50 mole of di[1-(3-methoxybutyroxy)-n-butyl] ether. Also recovered were 0.2 mole of unreacted di(1-propionoxy-n-butyl) ether, 1.69 moles of unreacted 3-methoxybutyric acid and 1.30 moles of propionic acid. The 1-propionoxy-1'-(3-methoxybutyroxy) di-n-butyl ether product had an indicated purity of greater than 98 percent and had the following physical properties: a boiling point of 116° C. at an absolute pressure of 0.4 millimeters of mercury, a specific gravity of 0.983 at 20/20° C., and a refractive index of 1.4298 at a temperature of 20° C. The di]1-(3-methoxybutyroxy)-n-butyl] ether product had an indicated purity of 9.6 percent and had the following physical properties: a boiling point of 137° C. at an absolute pressure of 0.3 millimeters of mercury, a specific gravity of 1.007 at 20/20° C., and a refractive index of 1.4327 at a temperature of 20° C.

EXAMPLE XIV

In a manner and using equipment similar to that described in Example VIII, 4 moles of di(1-acetoxyethyl) ether was reacted with 1.0 mole of 2,4-hexadienoic acid using an ortho-phosphoric acid catalyst in a concentration of 0.35 percent by weight of the catalyst based upon the weight of the reactants. The reaction mixture was gradually heated to, and then maintained at a temperature of 90° C. for a period of 2 hours. Thereafter, the reaction mixture was cooled to, and maintained at a temperature of 25° C. for a period of 16 hours. Upon completion of the reaction period, the acid catalyst was neutralized by the addition of anhydrous sodium acetate. Phenothiazine was then added to the crude reaction product in a concentration of 0.1 percent by weight, after which the product was subsequently resolved by fractional distillation under reduced pressure. The products recovered in this manner included 0.90 mole of 1-acetoxy-1'-(2,4-hexadienoxy)diethyl ether, 2.95 moles of unreacted di(1-acetoxyethyl) ether, 0.03 mole of unreacted 2,4-hexadienoic acid, and 0.98 mole of acetic acid. The 1-acetoxy-1'-(2,4-hexadienoxy)diethyl ether product had an indicated purity of 101 percent and had the following physical properties: a boiling point of 97° C. at an absolute pressure of 0.25 millimeters of mercury, a specific gravity of 1.049 at 20/20° C., and a refractive index of 1.4797 at a temperature of 20° C.

EXAMPLE XV

To a 3-liter distillation flask, equipped with stirrer and thermometer and surrounded by a heating mantle, there were charged 950 grams (5.0 moles) of di(1-acetoxyethyl) ether, 244 grams (2.0 moles) of benzoic acid and 2.8 grams of 95 percent sulfuric acid. The reaction mixture was stirred at a temperature of 25° C. for a period of 5 minutes, whereupon all of the benzoic acid went into solution. Accompanied by continued stirring, the reaction mixture was then heated to, and maintained at a temperature of 85° C. for a period of 1 hour. Upon completion of the reaction period, the acid catalyst was neutralized by the addition of 5 grams of anhydrous sodium acetate, after which the crude reaction product was subjected to fractional distillation under reduced pressure using a still column 41 millimeters in diameter, 12 inches in length and packed with 0.16-inch by 0.16-inch protruded packing. Distillate was removed until the kettle temperature reached 157° C. under a absolute pressure of 1.3 millimeters of mercury. The contents of the kettle were then filtered to remove the sodium sulfate present and were subsequently found by analysis to contain 30 grams of unreacted benzoic acid. The acid was then neutralized by the addition of 13 grams of sodium methylate contained in 300 milliliters of dioxane, after which distillation was resumed, first to remove dioxane and liberate methanol and then to recover the reaction products. In this manner, 290 grams (1.15 moles) of 1-acetoxy-1'-benzoxydiethyl ether were recovered as a distillate at a vapor temperature of from 110° to 112° C. and at an absolute pressure of 0.4 millimeters of mercury. Similarly, 52 grams (0.17 mole) of di(1-benzoxyethyl) ether were recovered as a distillate at a vapor temperature of from 165° to 167° C. and at an absolute pressure of 0.6 millimeters of mercury. The 1-acetoxy-1'-benzoxydiethyl ether product had an indicated purity of 101.5 percent and had the following physical properties: a melting point of −32° C., a specific gravity of 1.123 at 20/20° C., and a refractive index of 1.4865 at a temperature of 20° C. 1-Acetoxy-1'-benzoxydiethyl ether was also found to be an effective solvent for a wide variety of organic compounds, including many aliphatic and aromatic carboxylic acids and esters. The di(1-benzoxyethyl) ether product had an indicated purity of 98.2 percent and had a melting point of 55° C.

EXAMPLE XVI

The apparatus used in this experiment consistedc consisted a 2-liter still kettle surmounted by a column 40 millimeters in diameter and 36 inches in length. The column was packed with 0.16-inch by 0.16-inch protruded packing. To the still kettle there were charged 952 grams of di(1-acetoxyethyl) ether. Heat was applied to the kettle rapidly enough to cause the contents to boil vigorously at atmospheric pressure. The temperature of the boiling contents of the kettle was 192° C. The still was operated under total reflux for about one-half hour until the vapor temperature descended to 124° C., at which point the removal of distillate was begun. Over a period of 12 hours, a distillate amounting to 822 grams was removed at a head temperature ranging from 122° to 126° C. and at an average reflux ratio of 5 to 1. The final kettle temperature was 198° C. Chemical analysis of the distillate showed an acetic acid content of 31.2 percent by weight as compared with a theoretical value of 31.6 percent by weight. Analysis of the distillate for ester content showed a concentration of 69.0 per cent by weight as determined by saponification and 69.8 percent by weight as measured by a determination of unsaturation; the ester in each case was calculated as vinyl 1-actoxyethyl ether. These results compare with a theoretical value of 68.4 percent by weight, assuming quantitative conversion of di(1-acetoxyethyl) ether to acetic acid and vinyl 1-acetoxyethyl ether. Analysis by saponification of the final residue of 85 grams showed it to consist of 95 percent by weight of di(1-acetoxyethyl) ether. The difference between the charge and the total of the distillate and residue was 45 grams. This material was retained in the column packing and consisted of a mixture of di(1-acetoxyethyl) ether, acetic acid and vinyl 1-acetoxyethyl ether. From the foregoing results, it is apparent that the degree of conversion was about 90 percent and that the efficiency from di(1-acetoxyethyl) ether to vinyl 1-acetoxyethyl ether and acetic acid was substantially quantitative.

The distillate was redistilled in a 30-plate, glass Oldershaw column under an absolute pressure of 50 millimeters of mercury and at a reflux ratio of 5 to 1. The first fraction of 130 grams was removed at a head temperature of from 47° to 49.5° C. Of this material, 89 percent by weight was acetic acid and 11 per cent by weight was vinyl 1-acetoxyethyl ether. Several intermediate fractions then were removed at a gradually increasing head temperature, each fraction containing a higher concentration of vinyl 1-acetoxyethyl ether and a lower concentration of acetic acid. A final fraction of 300 grams was removed from the still at a head temperature of 58.5° to 59° C. Of this material, 98 percent by weight was vinyl 1-acetoxyethyl ether and 2 percent by weight was acetic acid. The final fraction was redistilled in the presence of an amount of sodium hydroxide equivalent to 120 percent by weight of the contained acetic acid, thereby yielding pure vinyl 1-acetoxyethyl ether having a boiling point of 59° C., at an absolute pressure of 50 millimeters of mercury. The vinyl 1-acetoxyethyl ether product had an indicated purity of 100 percent. In addition the vinyl 1-acetoxyethyl ether product had the following physical properties: a specific gravity of 0.976 at 20/20° C. and a refractive index of 1.4083 at a temperature of 20° C.

EXAMPLE XVII

Using the same apparatus employed in Example VIII, di(1-acetoxyethyl) ether was subjected to pyrolysis at atmospheric pressure in a continuous operation as described below. The initial reaction was carried out in a manner similar to that described in Example XVI. In addition, as the contents of the kettle decreased upon removal of distillate from the system, fresh di(1-acetoxyethyl) ether was fed to the kettle at such a rate as to maintain a constant volume therein. Over a period of 70 hours of continuous operation in this manner, the contents of the kettle were displaced 10 times. After the feed of fresh material was terminated, the reaction was allowed to proceed until the contents of the kettle were reduced to one-fifth the original volume. During the reaction, the kettle temperature was maintained in the range of from 192° to 202° C. One part by weight of the equimolar mixture of vinyl 1-acetoxyethyl ether and acetic acid obtained as the distillate from the still was then extracted batchwise with 0.9 part by weight of water and 1.25 parts by weight of heptane. The hydrocarbon phase from this extraction contained 97 percent by weight of the total vinyl 1-acetoxyethyl ether present, while the aqueous phase contained 92 percent by weight of the total acetic acid present. The concentrations in the hydrocarbon layers were 36.1 percent by weight of vinyl 1-acetoxyethyl ether, 2.0 percent by weight of acetic acid, and 0.2 per cent by weight of water. The hydrocarbon phase from the extraction was distilled under an absolute pressure of 50 millimeters of mercury. First, the heptane was distilled off, after which an intermediate fraction was removed. The majority of the vinyl 1-acetoxyethyl ether was then distilled off as substantially pure material.

EXAMPLE XVIII

To the kettle of a still there were charged 525 grams of di(1-crotonoxyethyl) ether. The absolute pressure in the system was reduced to 160 millimeters of mercury and the kettle was heated to a temperature of 180° C., at which temperature vigorous boiling was observed. Over a period of 4 hours, 507 grams of distillate was removed from the still at an average head temperature of 130° C. The final kettle temperature was 200° C. Analysis of the distillate indicated that it contained 66.2 percent by weight of vinyl 1-crotonoxyethyl ether and 34.6 percent by weight of crotonic acid. These values compared favorably with the respective theoretical values 64.5 percent and 35.5 percent by weight, assuming quantitative conversion of the starting material to the two products. The distillate from the still was then redistilled under reduced pressure. First, the crotonic acid was distilled off. Then, after a small intermediate fraction was removed, the majority of the vinyl 1-crotonoxyethyl ether was removed at a head temperature of 67° C. and an absolute pressure of 10 millimeters of mercury. The vinyl 1-crotonoxyethyl ether product had an indicated purity of 98 percent and had the following physical properties: a specific gravity of 0.978 at 20/20° C. and a refractive index of 1.4440 at a temperature of 20° C.

EXAMPLE XIX

Di(1-propionoxypropyl) ether was subjected to pyrolysis using the equipment and in a manner similar to that described in Example XVI. The still was operated under an absolute pressure of between 300 and 500 millimeters of mercury while the kettle temperature was maintained in the range of from 190° to 215° C. The average head temperature was 155° C. The degree of conversion of the starting material was 96 percent, while the efficiency to 1-propenyl 1-propionoxypropyl ether and propionic acid products was 71 percent. The distillate from the pyrolysis was redistilled under reduced pressure to yield a 1-propenyl 1-propionoxypropyl ether product having an indicated purity of 100 percent. In addition, the purified 1-propenyl 1-propionoxypropyl ether product had the following physical properties: a boiling point of 55° C. at an absolute pressure of 3.5 millimeters of mercury, a specific gravity of 0.938 at 20/20° C. and a refractive index of 1.4232 at a temperature of 20° C.

EXAMPLE XX

Di(1-acetoxy-3-methoxybutyl) ether was subjected to pyrolysis using equipment and in a manner similar to that described in Example XVI. The still was operated under an absolute pressure of 60 millimeters of mercury. The kettle temperature was maintained in the range of from 200° to 215° C. and the average head temperature was 140° C. Over a period of 4 hours, b 67 percent of the starting material was converted. The efficiency to 3-methoxy-1-butenyl 3-methoxy-1-acetoxybutyl ether and acetic acid was 95 percent. The distillate from the pyrolysis still was redistilled under reduced pressure to yield of 3-methoxy-1-butenyl 3-methoxy-1-acetoxybutyl ether product having an indicated purity of 99.6 percent. In addition, the purified 3-methoxy-1-butenyl 3-methoxy-1-acetoxybutyl ether product had the following physical properties: a boiling point of 80° C. at an absolute pressure of 0.4 millimeter of mercuty, a specific gravity of 0.999 at 20/20° C., and a refractive index of 1.4353 at a temperature of 20° C.

EXAMPLE XXI

Di(1-acetoxy-4-pentenyl) ether was subjected to pyrolysis using equipment and in a manner similar to that described in Example XVI. The still was operated under an absolute pressure of 210 millimeters of mercuty. The kettle temperature was maintained in the range of from 210° to 220° C. and the average head temperature was 140° C. The duration of the experiment was 8 hours, during which time substantially complete conversion of the starting material was obtained. The efficiency to 1,4-pentadienyl 1-acetoxy-4-pentenyl ether and acetic acid was 70 percent. The distillate from the still was redistilled under reduced pressure to yield a 1,4-pentadienyl 1-acetoxy-4-pentenyl ether product having an indicated purity of greater than 99 percent. In addition, the purified 1,4-pentadienyl 1-acetoxy-4-pentenyl ether product had the following physical properties: a boiling point of 65° C. at an absolute pressure of 0.5 millimeter of mercury, a specific gravity of 0.945 at 20/20° C., and a refractive index of 1.4522 at a temperature of 20° C.

EXAMPLE XXII

Di(1-actoxy-n-butyl) ether was subjected to pyrolysis using equipment and in a manner similar to that described in Example XVI. The still was operated under an absolute pressure of 200 millimeters of mercury. The kettle temperature was 190° C. and the head temperature was 135° C. Over a period of 4 hours, 95 percent by weight of the starting material was converted. The efficiency to 1-butenyl 1-acetoxy-n-butyl ether was acetic acid was 92 percent. The distillate from the reaction still was redistilled under reduced pressure to yield a 1-butenyl 1-acetoxy-n-butyl ether product having an indicated purity of 99.6 percent. In addition, the purified 1-butenyl 1-acetoxy-n-butyl ether product had the following physical properties: a boiling point of 82° C. at an absolute pressure of 10 millimeters of mercury, a specific gravity of 0.924 at 20/20° C., and a refractive index of 1.4256 at a temperature of 20° C.

EXAMPLE XXIII

To a mixture composed of equal parts by weight of vinyl 1-acetoxyethyl ether and ethylene dichloride and contained in a reaction flask, equipped with a stirrer and immersed in a dry ice bath, there was slowly added with stirring, at a temperature of −5° C., and amount of chlorine approximately equimolar in quantity with respect to the amount of vinyl 1-acetoxyethyl ether present. Upon complete addition of the chlorine, the resulting mixture was distilled under reduced pressure, whereupon a substantially pure 1,2-dichloroethyl 1-acetoxyethyl ether product was recovered in an essentially quantitative yield. The product had the following physical properties: a boiling point of 65° C. at a pressure of 1.5 millimeters of mercury, a specific gravity of 1.240 at 20/20° C., and a refractive index of 14440 at a temperature of 20° C. This dihalogenated product was found to be an excellent solvent for numerous organic compounds including organic acids such as oleic acid and trichloroacetic acid, crotonic anhydride, organic esters such as tributyl phosphate and methyl oleate, and many others.

A methanol solution of vinyl 1-acetoxyethyl ether was added to a methanol solution of bromine which has been saturated with sodium bromide. Essentially instantaneous conversion to a 1,2-dibromoethyl 1-acetoxyethyl ether product occurred.

EXAMPLE XXIV

In a manner and using equipment similar to that described in Example XXIII, 82.8 grams (0.517 mole) of bromine was added to, and reacted with 107 grams (0.575 mole) of 1-butenyl 1-acetoxybutyl ether at a temperature of 5° C. Upon the complete addition of the bromine, the resulting mixture was distilled under reduced pressure, whereupon a substantially pure 1,2-dibromo-1'-acetoxydibutyl ether product was recovered in an essentially quantitative yield at a vapor temperature of 102° C., and at an absolute pressure of 0.8 millimeters of mercury. The product had the following physical properties: a specific gravity of 1.452 at 25/20° C. and a refractive index of 1.4892 at a temperature of 20° C.

EXAMPLE XXV

In a flask equipped with a stirrer and thermometer 650 grams (5.0 moles) of vinyl 1-acetoxyethyl ether were admixed with 230 grams (5.0 moles) of anhydrous formic acid. Mixing was accomplished by the simultaneous and rapid introduction of the ether and acid into the reactor, accompanied by stirring, whereupon a vigorous and exothermic reaction ensued. The temperature of the reaction mixture rose to 90° C. during a period of about 5 minutes. The reaction mixture was then cooled to a temperature of 70° C. and maintained at this temperature, with stirring, for a period of one hour. Upon completion of the reaction period, the crude reaction product was resolved into its component parts by fractional distillation under reduced pressure using a still column 30 millimeters in diameter, 30 inches in length and packed with 0.16-inch by .16-inch protruded packing. In this manner, 157 grams of unreacted vinyl 1-acetoxyethyl ether and 56 grams of unreacted formic acid were first recovered. Thereafter, 598 grams of a 1-formoxy-1'-acetoxydiethyl ether product were also recovered at a vapor temperature of 95° C. and at an absolute pressure of 30 millimeters of mercury. The 1-formoxy-1'-acetoxydiethyl ether product had an indicated purity of 99.7 percent and had the following physical properties: a specific gravity of 1.109 at 20/20° C. and a refractive index of 1.4068 at a temperature of 20° C. The conversion to 1-formoxy-1'-acetoxydiethyl ether was 76 percent of each reactant, while the efficiency was 90 percent based on each reactant.

EXAMPLE XXVI

In a flask equipped with a stirrer and thermometer, a mixture consisting of an equimolar proportion of 1-propenyl 1-propionoxypropyl ether and 2-methylpentanoic acid was heated to, and maintained at a temperature of 100° C. for a period of 5 hours. Upon completion of the reaction period, the crude reaction product was fractionally distilled under reduced pressure using a still column similar to that described in Example XXV, whereupon a 1-propionoxy-1'-(2-methylpentanoxy)dipropyl ether product was recovered at a vapor temperature of 109° C. and at an absolute pressure of 1.5 millimeters of mercury. The 1-propionoxy-1'-(2-methylpentanoxy)dipropyl ether product had an indicated purity of 99.2 percent and had the following physical properties: a specific gravity of 0.965 at 20/20° C. and a refractive index of 1.4244 at a temperature of 20° C. The conversion to 1-propionoxy-1'-(2-methylpentanoxy)dipropyl ether was 46 percent of each reactant, while the efficiency was 88 percent based on each reactant.

EXAMPLE XXVII

In a flask equipped with a stirrer, thermometer and condenser, a mixture consisting of 1.0 mole of 1-butenyl 1-acetoxybutyl ether and 1.6 moles of propionic acid was refluxed for three hours at a temperature maintained in the range of 147 to 154° C. Upon completion of the reaction period, the crude reaction product was fractionally distilled under reduced pressure using a still column similar to that described in Example XXV, whereupon a 1-acetoxy-1'-propionoxydi-n-butyl ether product was recovered. The product had an indicated purity of 99.5 percent and had the following physical properties: a boiling point of 90° C. at an absolute pressure of 1.0 millimeters of mercury, a specific gravity of 0.984 at 20/20° C., and a refractive index of 1.4202 at a temperature of 20° C. The conversion to 1-acetoxy-1'-propionoxydi-n-butyl ether was 41.5 percent of the acid reactant and 85.7 percent of the ether reactant, while the efficiency was 91.5 percent based on the acid reactant and 85.7 per cent based on the ether reactant.

EXAMPLE XXVIIII

In a flask equipped with a stirrer and thermometer, a mixture consisting of 1.0 mole of vinyl 1-acetoxyethyl ether and 0.9 moles of 3-methoxybutyric acid was heated to, and maintained at a temperature of 100° C. for a period of 18 hours. Upon completion of the reaction period, the crude reaction product was fractionally distilled under reduced pressure using a still column similar to that described in Example XXV, whereupon a 1-acetoxy-1'-(3-methoxybutyroxy)diethyl ether product was recovered at a vapor temperature of 86° C. and at an absolute pressure of 0.5 millimeter of mercury. The product had an indicated purity of 99.5 percent and had the following physical properties: a specific gravity of 1.058 at 20/20° C. The conversion to 1-acetoxy-1'-(3-methoxybutyroxy)diethyl ether was 63.0 percent of the ether reactant and 73.5 percent of the acid reactant, while the efficiency was 93 percent based on the ether reactant and 88 percent based upon the acid reactant.

EXAMPLE XXIX

In a flask equipped with a stirrer and thermometer, a mixture consisting of 260 grams (2.0 moles) of vinyl 1-acetoxy ethyl ether and 112 grams (1.0 mole) of 2,4-hexadienoic acid was heated at a temperature of 100° C. for a period of 2 hours. At the conclusion thereof only a small portion of the acid had dissolved. At this point 500 grams of dioxane were added to the mixture and heating was continued at a temperature of 100° C. At the conclusion of another hour all of the acid was dissolved. The reaction mixture was then maintained at a temperature of 100° C. for a further period of 40 hours. Upon completion of the reaction under reduced pressure using a still column similar to that described in Example XXV. In this manner, after removing dioxane and unreacted vinyl 1-acetoxyethyl ether and 2,4-hexadienoic acid, a 1-acetoxy-1'-(2,4-hexadienoxy)diethyl ether product was recovered at a vapor temperature of 98° C. and at an absolute pressure of 0.3 millimeters of mercury. The product had an indicated purity of 99.0 percent and had the following physical properties: a specific gravity of 1.049 at 20/20° C. and a refractive index of 1.4797 at a temperature of 20° C. The conversion to 1-acetoxy-1'-(2,4-hexadienoxy)diethyl ether was 42.5 percent of the acid reactant and 20.2 percent of the ether reactant.

EXAMPLE XXX

In a flask equipped with a stirrer and a thermometer, a mixture consisting of 130 grams (1.0 mole) of vinyl 1-acetoxy ethyl ether, 40 grams (0.33 mole) of benzoic acid and 300 grams of dioxane was heated to, and maintained at a temperature of 100° C. for a period of 2 hours. Upon completion of the reaction period, the crude reaction product was fractionally distilled under reduced pressure using a still column similar to that described in Example XXV. In this manner, after removing dioxane and unreacted vinyl 1-acetoxyethyl ether and benzoic acid, a 1-acetoxy-1'-benzoxydiethyl ether product was recovered at a vapor temperature of 110° C. and at an absolute pressure of 0.5 millimeter of mercury. The product was substantially pure and had the following physical properties: a specific gravity of 1.123 at 20 20° C. and a refractive index of 1.4865 at a temperature of 20° C. The conversion to 1-acetoxy- 1'-benzoxydiethyl ether was 81.5 percent of the acid reactant and 28.8 percent of the ether reactant.

EXAMPLE XXXI

In a flask equipped with a stirrer and thermometer, a mixture consisting of 483 grams (3.72 moles) of vinyl 1-acetoxyethyl ether, 211 grams (2.93 moles) of acrylic acid and 0.35 gram of phenothiazine was heated to, and maintained at a temperature of 100° C. for a period of 6 hours. Upon completion of the reaction period, the crude reaction product was fractionally distilled under reduced pressure. In this manner, at a kettle temperature of from 200° to 225° C., a 1-acetoxy-1'acryloxydiethyl ether product was recovered at a vapor temperature of from 68° to 78° C. and at an absolute pressure of from 2 to 4 millimeters of mercury. The product had the following physical properties: a specific gravity of 1.066 at 20/20° C. and a refractive index of 1.4202 at a temperature of 20° C. The conversion to 1-acetoxy-1'-acryloxydiethyl ether was 62.5 percent of the ether reactant and 79.0 percent of the acid reactant, while the efficiency was 98.5 percent based upon the ether reactant and 100.0 percent based upon the acid reactant.

EXAMPLE XXXII

In a flask equipped with a stirrer, thermometer and condenser, a mixture consisting of 1 mole of vinyl 1-acetoxy ethyl ether, 1 mole of methacrylic acid and 0.1 percent by weight of hydroquinone based upon the weight of the reactants was heated to, and maintained at a temperature of 100° C. for a period of 6 hours. Upon completion of the reaction period, the crude reaction product was fractionally distilled under reduced pressure using a still column similar to that described in Example XXV, whereupon a 1-acetoxy-1'-methacryloxydiethyl ether product was recovered. The product had an indicated purity of greater than 99 percent and had the following physical properties: a boiling point of 56° C. at an absolute pressure of 0.5 millimeter of mercury, a specific gravity of 1.053 at 20/20° C. and a refractive index of 1.4252 at a temperature of 20° C. The conversion to 1-acetoxy-1'-methacryloxydiethyl ether was 60 percent of each reactant, while the efficiency was 98 percent based on each reactant.

EXAMPLE XXXIII

In a flask equipped with a stirrer, thermometer, and condenser, a mixture consisting of 1 mole of 1-butenyl 1-acetoxybutyl ether and 1 mole of 2-methylpentanoic acid was heated to, and maintained at a temperature of 130° C. for a period of 6 hours. Upon completion of the reaction period, the crude reaction product was fractionally distilled under reduced pressure using a still column similar to that described in Example XXV, whereupon a 1-acetoxy-1'-(2-methylpentanoxy) di-n-butyl ether product was recovered. The product had an indicated purity of 99.2 percent and had the following physical properties: a boiling point of 129° C. at an absolute pressure of 1.4 millimeters of mercury, a specific gravity of 0.947 at 20/20° C., and a refractive index of 1.4272 at a temperature of 20° C. The conversion to 1-acetoxy-1'-(2-methylpentanoxy)di-n-butyl ether was 40 percent of each reactant, while the efficiency was greater than 90 percent based on each reactant.

EXAMPLE XXXIV

In 157 grams of acetone, there were dissolved 1.13 grams of a complex of diethyl ether and boron trifluoride containing 45 percent by weight of the fluoride. To the resulting mixture, vinyl 1-acetoxyethyl ether was added in increments of 10 grams. The ensuing reaction was vigorous and exothermic, and required external cooling to maintain the temperature within the range of 40° to 50° C. The total amount of vinyl 1-acetoxyethyl ether used in the reaction was 78 grams. Upon completion of the reaction, a poly(vinyl 1-acetoxyethyl ether) product was obtained in acetone solution. Portions of the polymer solution were then spread on glass and glazed ceramic surfaces and allowed to dry overnight at room temperature. The resulting coating was a hard, transparent, pale yellow o white, non-tacky film which adhered tenaciously to the glass and glazed porcelain surfaces. The coating was soluble in alcohols, chlorinated hydrocarbons, aromatic hydrocarbons, esters and ketones, and insoluble in water, aliphatic hydrocarbons and aliphatic ethers.

EXAMPLE XXXV

A sample of vinyl 1-crotonoxyethyl ether was stored in a clear glass vessel at a temperature of 25° C. for 3 months. At the end of this time the ether had polymerized to a completely hard, clear, glass-like polymer which was water-white in color and water insoluble. The poly(vinyl 1-crotonoxyethyl ether) product thereby formed did not soften or discolor upon being heated to a temperature of 230° C.

EXAMPLE XXXVI

To 25 grams of refined vinyl 1-acetoxyethyl ether there was added 0.1 gram of concentrated sulfuric acid. Upon addition of the sulfuric acid catalyst, an exothermic polymerization ensued After four hours, a poly(vinyl 1-acetoxyethyl ether) product formed in an essentially quantitative yield as a hard, brittle and semicrystalline solid.

EXAMPLE XXXVII

In 65 grams of diisopropyl ether, there were dissolved 1.13 grams of a boron trifluoride-diethyl etherate complex containing 45 percent by weight of boron trifluoride. The temperature of the resulting mixture was adjusted to 25° C. Over a 10-minute period, 20 grams of 3-methoxy-1-butenyl 1-acetoxy-3-methoxybutyl ether were then added to the mixture. The temperature of the mixture rose to 30° C. and decreased. The mixture was allowed to stand for 16 hours, after which the diisopropyl ether solvent was evaporated on a steam bath. The remaining brown-colored poly(3-methoxy-1-butenyl 1-acetoxy-3-methoxybutyl ether) product was a hard, non-tacky and water insoluble solid.

EXAMPLE XXXVIII

In 150 grams of chloroform, there were dissolved 1.13 grams of a boron trifluoride-diethyl etherate complex containing 45 percent by weigh of boron trifluoride. The temperature of the resulting mixture was adjusted to 25° C., after which 30 grams of 1-butenyl 1-acetoxybutyl ether were added in increments of 5 grams. The total time of addition was 15 minutes. The temperature of the mixture rose to 45° C. and then decreased. The mixture was allowed to stand for 16 hours, after which the chloroform solvent was evaporated on a steam bath. The remaining poly(1-butenyl 1-acetoxybutyl ether) product was a viscous, mobile liquid at 100° C. and a soft, pasty, adhesive solid at 25° C.

EXAMPLE XXXIX

In 25 grams of 1-acetoxy-1'-acryloxydiethyl ether, there was dissolved 0.01 gram of benzoyl peroxide. The solution was then heated to, and maintained at a temperature of 100° C. for a period of 6 hours. In this manner, a poly(1-acetoxy-1'-acryloxydiethyl ether) product was obtained in essentially quantitative yield as a colorless, transparent solid. The polymeric product was pliable and non-tacky at ambient temperature, had a specific gravity of 1.30 and was found to be soluble in water, methanol, isopropanol, and acetone, but insoluble in isopropyl ether, ethylene dichloride, toluene, n-heptane and glycol diacetate.

EXAMPLE XL

In 28 grams of 1-acetoxy-1'-(2,4-hexadienoxy)diethyl ether, there was dissolved 0.06 gram of benzoyl peroxide. The solution was heated to, and maintained at a temperature of 100° C. for a period of 12 hours. In this manner, a poly[1-acetoxy-1'-(2,4-hexadienoxy)diethyl ether] product was obtained in essentially quantitative yield as a soft, stretchable, gummy solid. The polymeric product was tacky and adhered tenaciously to glass and other smooth surfaces. In addition, the polymeric product was found to have a specific gravity of 1.12, to be soluble in acetone, methanol, isopropanol, n-heptane, toluene, ethylene dichloride, isopropyl ether, dioxane, glycol diacetate and di-(1-acetoxyethyl) ether, and to be slightly soluble in water.

This invention is susceptible of further modification within the scope of the appended claims.

What is claimed is:

1. A compound of the formula:

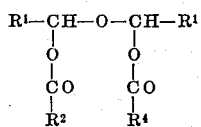

wherein $R^1$ designates a monovalent aliphatic hydrocarbon containing from one to about 11 carbon atoms, and which is connected to the adjacent carbon atom by a saturated carbon atom, $R^2$ is a monovalent aliphatic hydrocarbon containing from one to about 11 carbon atoms and $R^4$ is a monovalent unsaturated aliphatic hydrocarbon.

2. 1-Acetoxy-1'-crotonoxydiethyl ether.
3. 1-Acetoxy-1'-(4-pentenoxy)di(2-methylpentyl) ether.
4. 1-Acetoxy-1'-(2,4-hexadienoxy)diethyl ether.
5. 1-Acetoxy-1'-acryloxydiethyl ether.

* * * * *

UNITED STATES PATENT OFFICE
CERTIFICATE OF CORRECTION

Patent No. 3,700,722            Dated October 24, 1972

Inventor(s) Lucian W. McTeer

It is certified that error appears in the above-identified patent and that said Letters Patent are hereby corrected as shown below:

Column 2, line 11, "in" should read --of--; line 35, "designated" should read --designates--. Column 11, line 69, "a out" should read --about--. Column 36, line 24, "20 20°" should read --20/20°--. Column 37, line 45, "o" should read --to--. Column 38, line 25, "weigh" should read --weight--.

Signed and Sealed this ninth Day of March 1976

[SEAL]

Attest:

RUTH C. MASON
*Attesting Officer*

C. MARSHALL DANN
*Commissioner of Patents and Trademarks*